(12) United States Patent
Xu

(10) Patent No.: US 11,841,834 B2
(45) Date of Patent: *Dec. 12, 2023

(54) METHOD AND APPARATUS FOR EFFICIENT SYNCHRONIZATION OF SEARCH HEADS IN A CLUSTER USING DIGESTS

(71) Applicant: Splunk Inc., San Francisco, CA (US)

(72) Inventor: Yuan Xu, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/725,132

(22) Filed: Apr. 20, 2022

(65) Prior Publication Data
US 2022/0245095 A1    Aug. 4, 2022

Related U.S. Application Data

(63) Continuation of application No. 16/793,845, filed on Feb. 18, 2020, now Pat. No. 11,347,695, which is a
(Continued)

(51) Int. Cl.
*G06F 16/00* (2019.01)
*G06F 16/178* (2019.01)
*G06F 16/188* (2019.01)

(52) U.S. Cl.
CPC .......... *G06F 16/178* (2019.01); *G06F 16/188* (2019.01)

(58) Field of Classification Search
CPC ..... G06F 16/178; G06F 16/188; G06F 16/273
See application file for complete search history.

(56) References Cited

U.S. PATENT DOCUMENTS 7,984,043 B1    7/2011 Waas
8,682,925 B1 *  3/2014 Marquardt ............ G06F 16/284
                                              707/741

(Continued)

OTHER PUBLICATIONS

Splunk, Splunk Documentation 6.3.3 Web.archive.org/web/20160305094905/http://docs.splunk.com/Documentation/Splunk/6.3.3/DistSearch/Whatisdistributedsearch (Year 2016) (Cited in Application U.S. Appl. No. 15/582,424).

(Continued)

*Primary Examiner* — Alexander Khong
(74) *Attorney, Agent, or Firm* — Artegis Law Group, LLP

(57) ABSTRACT

Embodiments of the present disclosure provide techniques for efficiently and accurately performing propagation of search-head specific configuration customizations across multiple individual configuration files of search heads of a cluster for a consistent user experience. The cluster of search heads may be synchronized such that the search heads operate to receive the configuration or knowledge object customizations from one or more clients from a central or lead search head. To reduce the amount of data that is transferred during propagation, the list of configuration or knowledge object customizations maintained in each search head is filtered from the list of the lead search head until a divergence point is determined. Once determined and communicated to the lead search head, the lead search head sends the configuration and knowledge object customization data that is absent from the internal list of the member search head.

20 Claims, 25 Drawing Sheets

Related U.S. Application Data continuation of application No. 15/401,427, filed on Jan. 9, 2017, now Pat. No. 10,606,810.

(56) References Cited

U.S. PATENT DOCUMENTS

| | | | |
|---|---|---|---|
| 9,047,246 B1* | 6/2015 | Rahut | G06F 11/184 |
| 9,069,607 B1* | 6/2015 | Gopalakrishna Alevoor | G06F 9/45558 |
| 9,128,779 B1* | 9/2015 | Gladkikh | G06F 16/2453 |
| 9,130,832 B1* | 9/2015 | Boe | H04L 41/5083 |
| 9,158,811 B1* | 10/2015 | Choudhary | G06F 16/24565 |
| 10,606,810 B2 | 3/2020 | Xu | |
| 11,347,695 B2 | 5/2022 | Xu | |
| 2005/0165827 A1* | 7/2005 | Schmitt | G06F 9/451 707/999.102 |
| 2006/0047798 A1* | 3/2006 | Feinleib | G06F 8/61 709/223 |
| 2009/0049010 A1* | 2/2009 | Bodapati | G06F 16/951 |
| 2009/0112780 A1 | 4/2009 | Chen et al. | |
| 2009/0282000 A1* | 11/2009 | Bennett | G06F 16/9535 |
| 2010/0030840 A1* | 2/2010 | O'Shea | H04L 63/123 709/201 |
| 2011/0072338 A1* | 3/2011 | Caldwell | G05B 19/41845 715/205 |
| 2012/0059823 A1 | 3/2012 | Barber et al. | |
| 2014/0236890 A1* | 8/2014 | Vasan | G06F 11/2094 707/610 |
| 2016/0092558 A1 | 3/2016 | Ago et al. | |
| 2017/0091183 A1* | 3/2017 | Kenchammana-Hosekote | G06F 16/9535 |
| 2017/0091215 A1* | 3/2017 | Beard | G06F 16/184 |
| 2017/0228661 A1* | 8/2017 | Chien | G06F 16/285 |
| 2018/0095966 A1* | 4/2018 | Fourney | G06F 16/9535 |
| 2020/0334304 A1* | 10/2020 | Reddy Vennapusa | G06F 16/2379 |

OTHER PUBLICATIONS

Loughran, Steve. Hadoop and Kerberos: The Madness Beyond the Gate. Mar. 1, 2016 http://wwwfreetechbooks.oom/hadoop-and-kerberos-themadness-beyond-the-gale-t921.html (year 2016) (Cited in U.S. Appl. No. 15/582,424).

* cited by examiner

| Data Summary | | | |
|---|---|---|---|
| Hosts (5) | Sources (8) | Sourcetypes (3) | ✕ |
| filter | | | |
| Host ⌄ | Count ⌄ | Last Update ⌄ | |
| mailsv | 9,829 | 4/29/14 1:32:47.000 PM | |
| vendor_sales | 30,244 | 4/29/14 1:32:46.000 PM | |
| www1 | 24,221 | 4/29/14 1:32:44.000 PM | |
| www2 | 22,595 | 4/29/14 1:32:47.000 PM | |
| www3 | 22,975 | 4/29/14 1:32:45.000 PM | |

Search & Reporting — 700

Save As ⌄   Close

Search | Pivot | Reports | Alerts

Q New Search index=_internal

All time ⌄   Smart Mode ⌄   🔍

✓ 168,850 events (before 7/22/14 9:27:35.00

Events (168,850) | Patterns

ⓘ Your search isn't generating any statist

---

Select Fields — 701   ✕

Which fields would you like to use as a Data Model?

○ All Fields (97) — 702
○ Selected Fields (3) — 703
⦿ Fields with at least [2] % coverage (49) — 704

Cancel                                OK

---

Pivot
Build tables and visualizations using multiple fields and metrics without writing searches.

Quick Reports
Click on any field in the events tab for a list of quick reports like 'Top Referrers' and 'Top Referrers by time'.

Search Commands ↗
Use a transforming search command, like timechart or stats, to summarize the data.

Original Search:
Search "error" | stats count BY host ← 802

Sent to peers:
Search "error" | prestats count BY host ← 804

Executed by search head:
Aggregate the prestats results received from peers ← 806

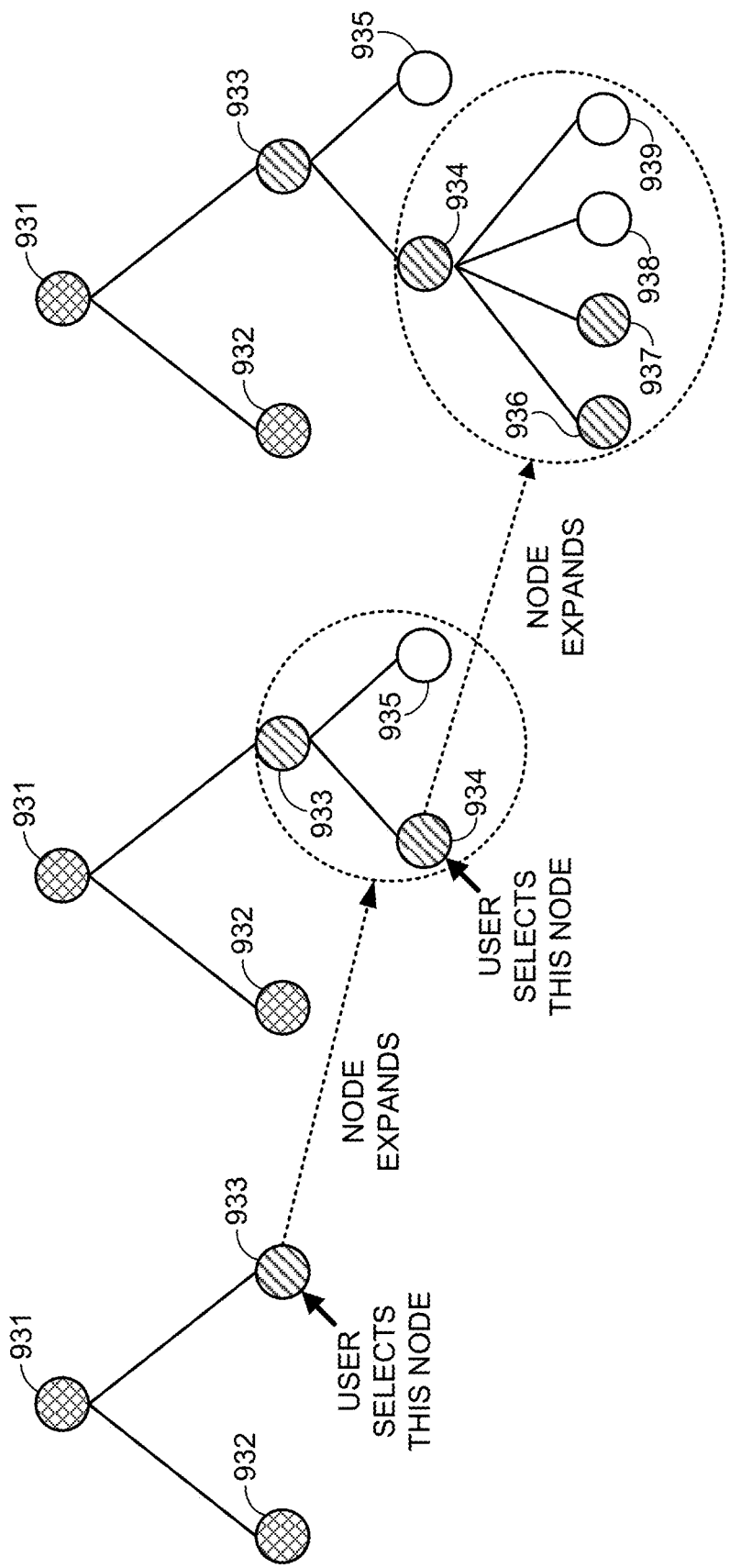

METHOD AND APPARATUS FOR EFFICIENT SYNCHRONIZATION OF SEARCH HEADS IN A CLUSTER USING DIGESTS

CROSS-REFERENCE OF RELATED APPLICATIONS

This application claims benefit as a Continuation of application Ser. No. 16/793,845, filed Feb. 18, 2020, titled "CLUSTERED SEARCH HEAD CONFIGURATION SYNCHRONIZATION," which claims benefit as a Continuation of application Ser. No. 15/401,427, filed Jan. 9, 2017, titled "CLUSTERED SEARCH HEAD CONFIGURATION SYNCHRONIZATION WITH BLOOM FILTER" the entire contents of the aforementioned are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

BACKGROUND

Modern data centers often comprise thousands of hosts that operate collectively to service requests from even larger numbers of remote clients. During operation, components of these data centers can produce significant volumes of machine-generated data. The unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be priority.

In particular, where multiple users from a single institution or even multiple institutions access the same data sets, maintaining a consistent user experience across all instances and interfaces in real time presents a distinct challenge, particularly when user customizations and configurations are supplied nearly simultaneously. Conventional techniques typically distribute a centralized configuration data set among all interfaces. However, as the size of the data set scales in relation to the data being processed, distributing entire data sets can become inefficient and result in undesirable delays, potential conflicts, and a compromised user experience.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

To reduce the amount of data is transmitted during configuration data propagation and synchronization, embodiments of the present disclosure provide solutions for determining the divergence between the journals of each member search head and the journal of the search head leader of a cluster of search heads. According to one or more embodiments of the present disclosure, a method is provided that includes accessing a list of knowledge object customizations in a search head leader, generating a reduced-size representation (e.g., a digest) of the list of knowledge object customizations, propagating the reduced-size representation to at least one member search head in the cluster, and determining the point of divergence in the member search head. In one or more embodiments, the point of divergence is identified by filtering the list of knowledge object customizations from the search head leader with a corresponding list in the member search head and determining the point of divergence. Once the point or origin of divergence is determined for a member search head and reported to the search head leader, the search head leader sends the knowledge object customizations in its journal after the divergence point to completely update that particular member search head. The same sequence of customization steps are also applied to all other members to ensure all member search heads in the cluster are configured consistently with the same knowledge customization objects.

According to a second embodiment of the present disclosure, to maintain an efficacy of the representation for the purposes of filtering, a size of the reduced-size representation in the search head leader is maintained at or below a pre-determined threshold size, or the remaining capacity of the reduced size presentation is maintained at or above a threshold capacity by comparing the size of the representation to the corresponding thresholds, accounting for the size of an incoming update. If the size is sufficient to accommodate the incoming update, the data from the update can be added to the representation. Otherwise, a new representation is generated and is supplied to member search heads in subsequent synchronization operations.

According to a third embodiment of the present disclosure, determination of a point of divergence between two lists of knowledge object customizations is performed by generating a Bloom filter bitmask from the first list, then applying one or more hash functions to the elements in the second list to determine addresses in the bitmask. The bit values at the addresses are referenced and indicate the presence or absence of each considered element. In one or more embodiments, this evaluation is performed for every element in the list of knowledge object customizations of the member search head until an element is determined to be absent, whereupon the element immediately preceding the absent element is identified as the divergence point.

According to still further embodiments, to reduce the rate of false positives inherent in Bloom filtering, a set of variable or constant size may be collectively evaluated, rather than each element individually. Where the set is of a constant size, new elements for consideration can be iteratively appended to the end of the set, with the top or first element being removed.

BRIEF DESCRIPTION OF THE DRAWINGS

In the drawings:

FIG. 6B illustrates a data summary dialog that enables a user to select various data sources in accordance with the disclosed embodiments;

FIG. 7 illustrates a user interface screen for an example data model-driven report generation interface in accordance with the disclosed embodiments;

FIG. 9C illustrates a proactive monitoring tree in accordance with the disclosed embodiments;

DETAILED DESCRIPTION

Figure 1:
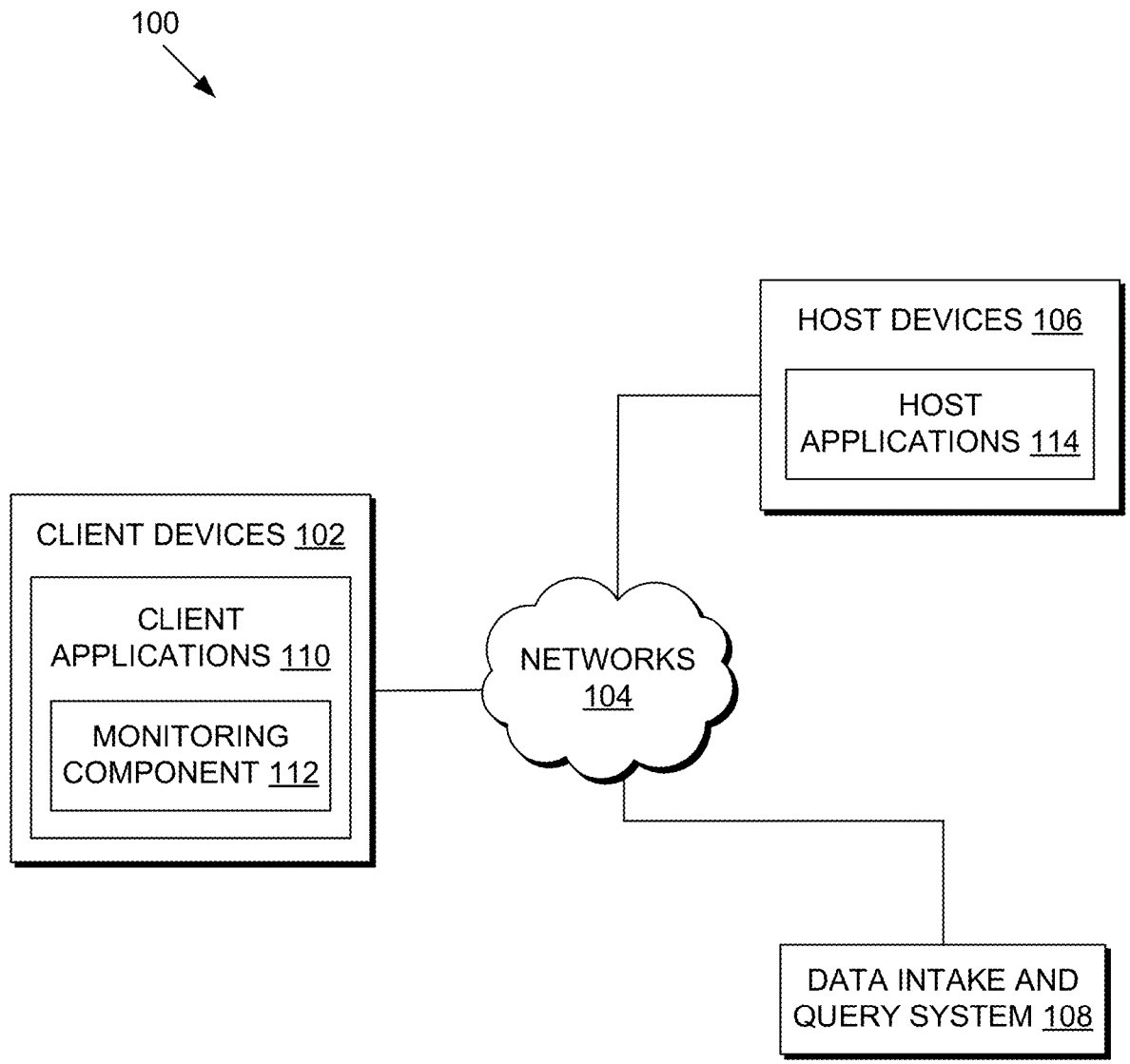
FIG. 1 illustrates a networked computer environment in which an embodiment may be implemented.

Embodiments are described herein according to the following outline:

1.0. General Overview
   1.1. Overview of Configuration Replication
2.0. Operating Environment
   2.1. Host Devices
   2.2. Client Devices
   2.3. Client Device Applications
   2.4. Data Server System
   2.5. Data Ingestion
      2.5.1. Input
      2.5.2. Parsing
      2.5.3. Indexing
   2.6. Query Processing
   2.7. Field Extraction
   2.8. Example Search Screen
   2.9. Data Modelling
   2.10. Acceleration Techniques
      2.10.1. Aggregation Technique
      2.10.2. Keyword Index
      2.10.3. High Performance Analytics Store
      2.10.4. Accelerating Report Generation
   2.11. Security Features
   2.12. Data Center Monitoring
   2.13. Cloud-Based System Overview
   2.14. Searching Externally Archived Data
      2.14.1. ERP Process Features
   2.15. IT Service Monitoring
3.0. Configuration Replication
   3.1. Example Search Head Cluster Environment
   3.2. Example Configuration Storage Environment
   3.3. Configuration Propagation
      3.3.1. Search Head Specific Propagation
      3.3.2. Divergence Determination
      3.3.3. False Positive Reduction Techniques 1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, California. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.) . . . . The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

1.1. Overview of Configuration Replication

The present disclosure is directed to replicating knowledge object customizations across multiple search heads of a cluster. Multiple search heads of a data aggregation and analysis system are grouped together to form a cluster. A search head may refer to a component of the data aggregation and analysis system that is responsible for a reduce phase of a map-reduce search performed by the data aggregation and analysis system, as further described below. A search head may communicate with one or more indexers that are responsible for a map phase of the map-reduce search, as further described below.

An example data aggregation and analysis system may aggregate heterogeneous machine-generated data received from various sources, including servers, databases, applications, networks, etc. The aggregated source data may comprise a plurality of events. An event may be represented by a data structure that is associated with a certain point in time and comprises a portion of raw machine data (i.e., machine-generated data). The system may be configured to perform real-time indexing of the source data and to execute real-time, scheduled, or historic searches on the source data. A search query may comprise one or more search terms specifying the search criteria. Search terms may include keywords, phrases, Boolean expressions, regular expressions, field names, name-value pairs, etc. The search criteria may comprise a filter specifying relative or absolute time values, to limit the scope of the search by a specific time value or a specific time range.

The example data aggregation and analysis system executing a search query may evaluate the data relative to the search criteria to produce a search result. The search result may comprise one or more data items representing one or more portions of the source data that satisfy the search criteria. The search result that is produced by the search query can include data derived using a late binding schema. A late binding schema is described in greater detail below. Search results returned in response to search queries can be presented to users via dashboards and other graphical user interfaces (GUIs).

Users can customize the search-related behavior of the system (e.g., by specifying interesting fields, event types and transactions, lookups and workflow actions, etc.) and the visualization behavior of the system (e.g., how to present the search results). In some embodiments, the users may customize the search-related and visualization behavior of the system by submitting a command, instruction, or request for a customization of a knowledge object (also referred to as a "knowledge object customization"). A knowledge object is a configuration relating to search activity or visualization that is permissible and controlled via an access control layer of the system that is customizable by a user. Exemplary knowledge objects include, but are not limited to, late-binding schema, a saved search, an event type, a transaction, a tag, a field extraction, a field transform, a lookup, a workflow action, a search command, and a view, which are discussed in more detail below. A customization may include any action operation relating to a knowledge object, such as, for example, the deletion of a knowledge object, editing of a knowledge object, sharing of a knowledge object, setting of permissions relating to of a knowledge object, creation of a knowledge object, modification of a knowledge object, changing of a knowledge object, or updating of a knowledge object. In operation, a user's device ("a client") interacts with one of the search heads of the cluster to submit one or more commands, instructions, or requests for configuration customizations to the search head. In the cluster, one of the search heads operates as a "leader" or "captain" responsible for communicating with the other search heads in the cluster.

The search head performs and stores the knowledge object customization in a local data store (e.g., stored on a local disk or in memory of the individual search head.) In an embodiment, the search head is configured to present the stored knowledge object customizations to the clients via a suitable user interface. In an embodiment, the search head maintains a journal including a record of one or more knowledge object customizations submitted by the clients. In response to receiving a knowledge object customization from a client, the search head adds a journal update to the journal maintained in the local data store. The search head applies the knowledge object customization by writing the knowledge object customization to a local configuration file maintained in the local data store.

During a synchronization phase, a search head in the cluster receives one or more knowledge object customization commits from the search head leader. The knowledge object customization commits represent knowledge object customizations made by other search heads in the cluster that have been reported to and recorded by the search head leader. In addition, during the synchronization phase, the search head sends one or more journal updates from its locally stored journal to the search head leader for replication to the other search heads in the cluster. Eventual consistency is achieved with respect to replication of knowledge object customizations across the cluster of search heads, such that changes on one search head appear on all search heads. Accordingly, the cluster achieves a consistent overall configuration across all of the search heads of the cluster. In addition, the cluster is able to provide a consistent search behavior and a consistent visualization experience to users, even as configurations are altered on individual members of the cluster.

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML, documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent or received by a client application 110. For example, the monitoring component 112 may be configured to monitor data packets transmitted to or from one or more host applications 114. Incoming or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 or client device 102. For example, a monitoring component 112 may be configured to collect device performance information by monitoring one or more client device operations, or by making calls to an operating system or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
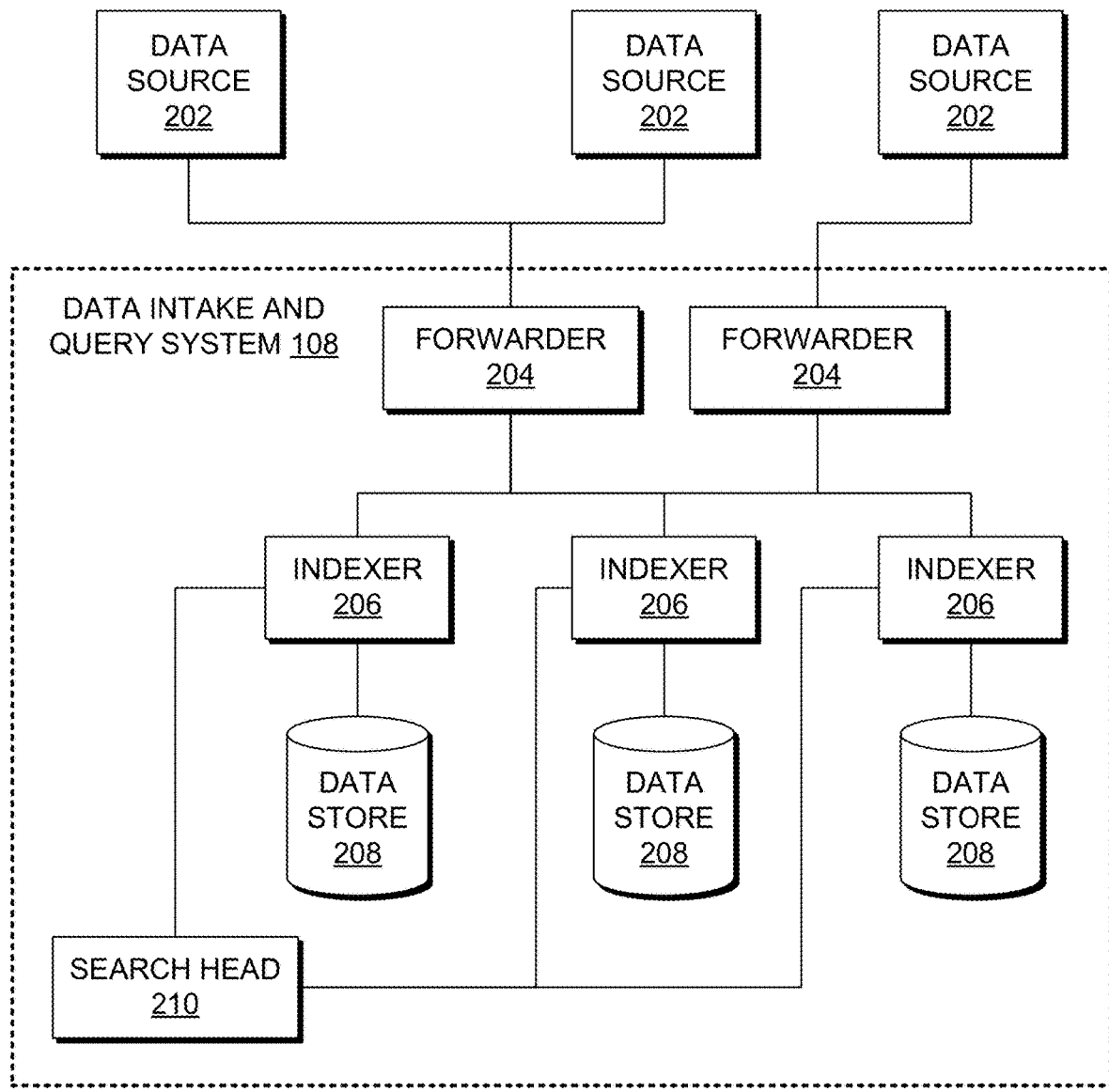
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
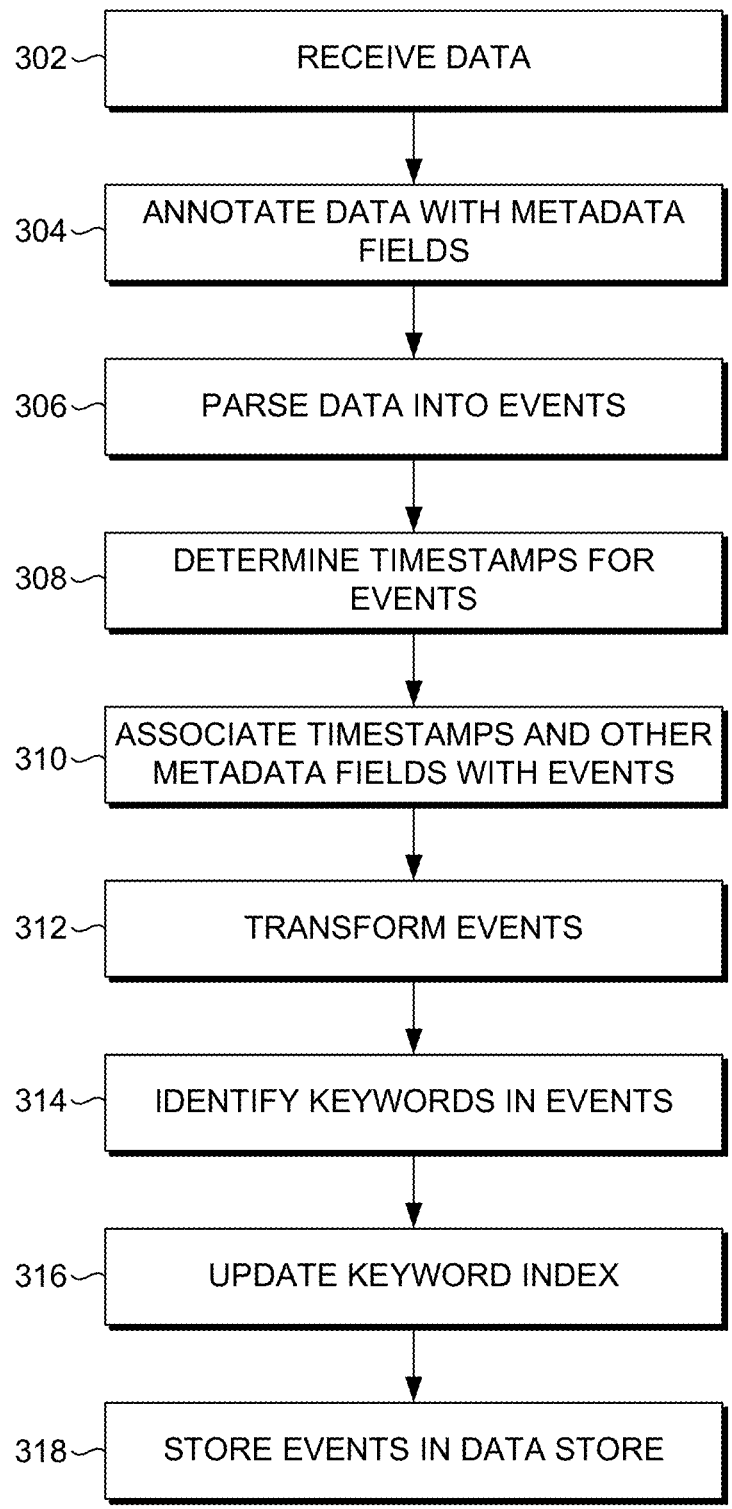
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
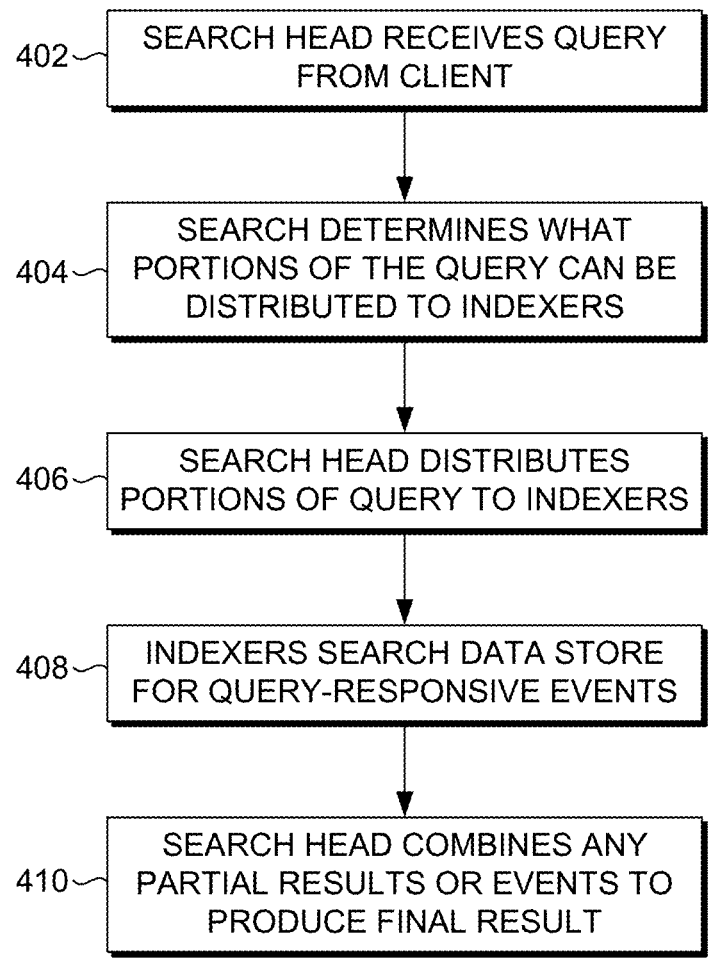
FIG. 4 is a flow diagram that illustrates how a search head and indexers perform a search query in accordance with the disclosed embodiments.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Figure) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "l" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
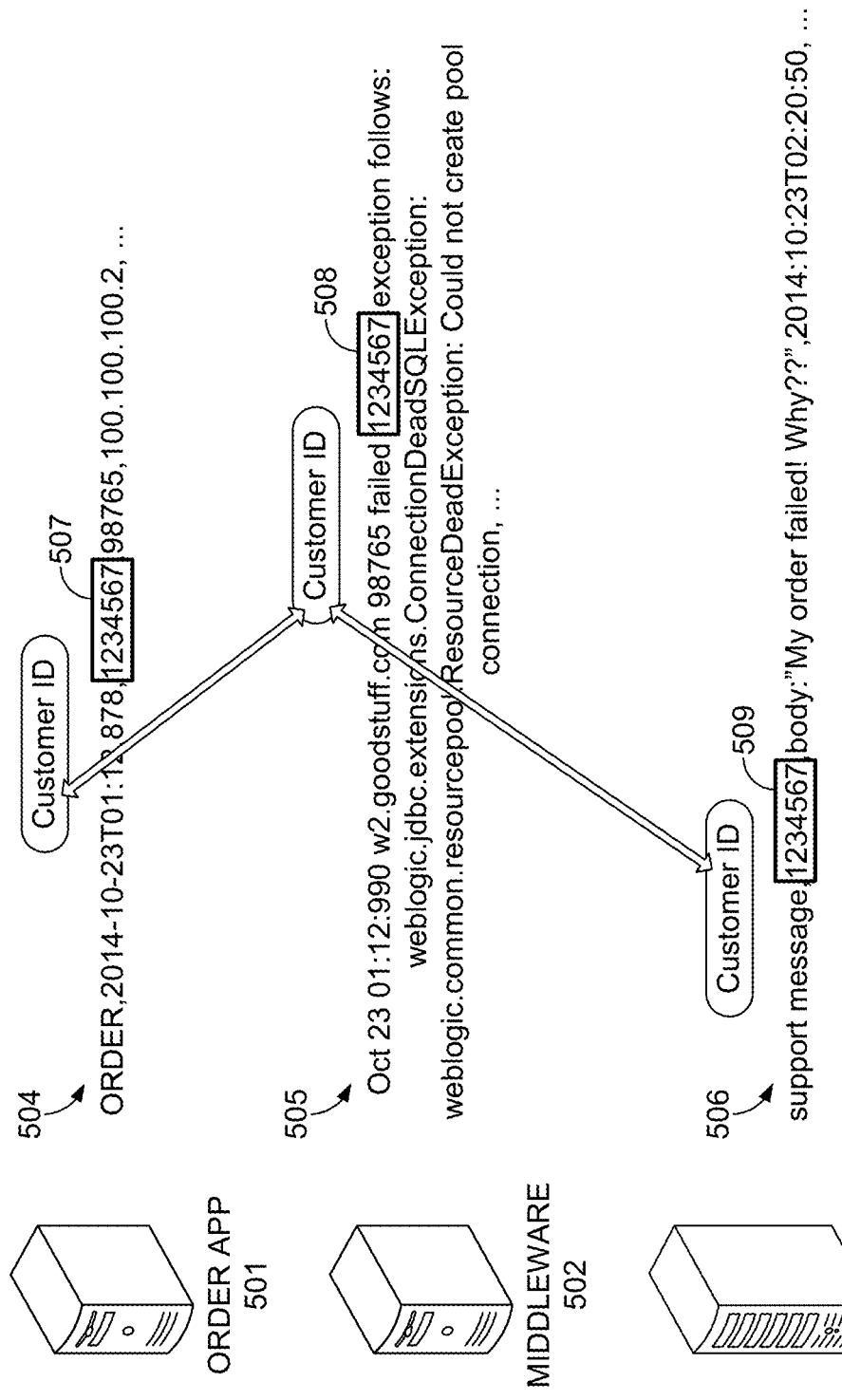
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
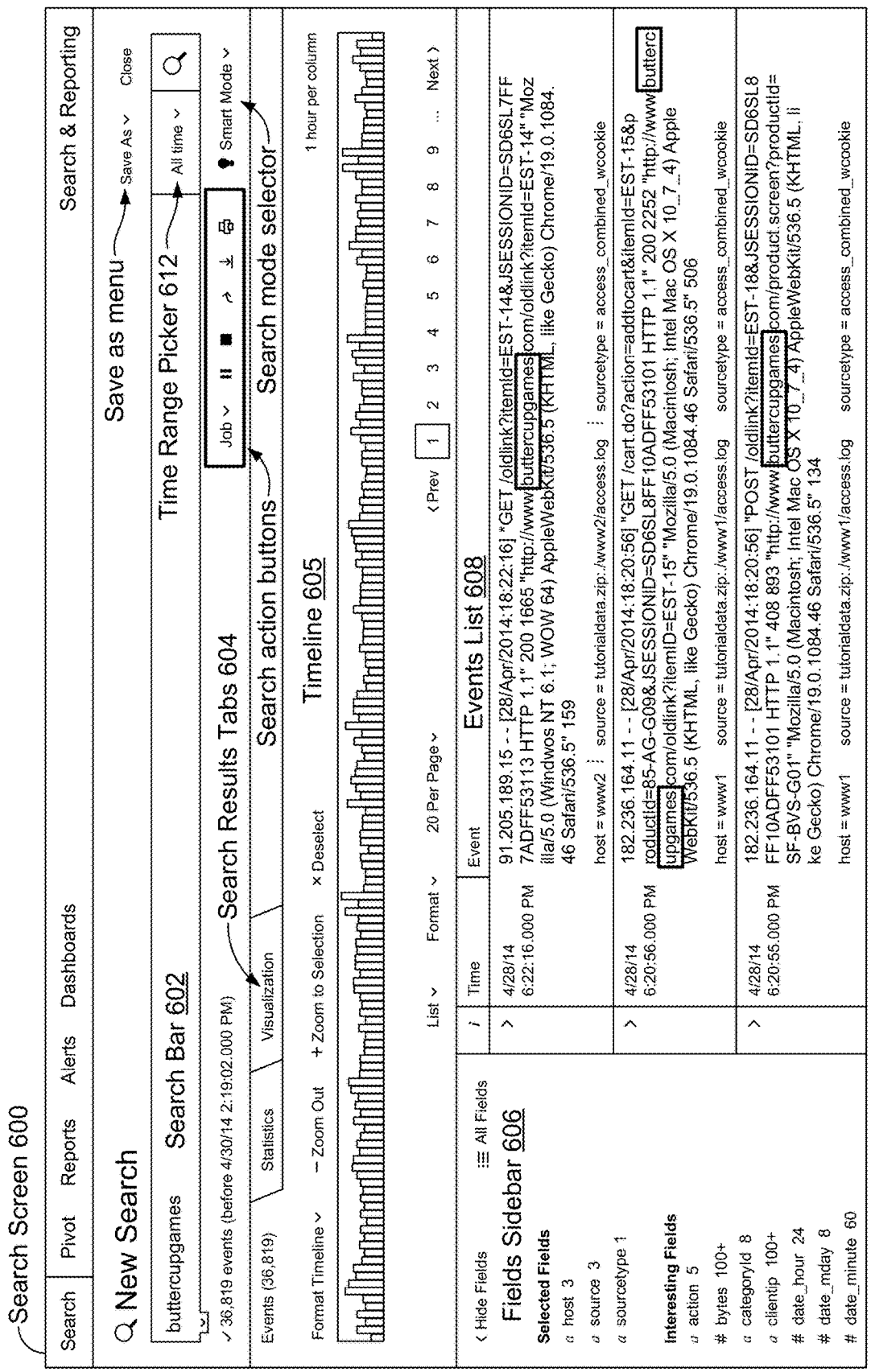
FIG. 6A illustrates a search screen in accordance with the disclosed embodiments.

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data. Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model or additional fields. Data model objects that reference the subsets can be arranged in a hierarchical manner, so that child subsets of events are proper subsets of their parents. A user iteratively applies a model development tool (not shown in Figure) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar., 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIG. 7 illustrates a user interface screens where a user may select report generation options using data models. The report generation process may be driven by a predefined data model object, such as a data model object defined or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

The selection of a data model object for use in driving a report generation may be facilitated by a data model object selection interface Once a data model object is selected by the user, a user interface screen 700 shown in FIG. 7 may display an interactive listing of automatic field identification options 701 based on the selected data model object. For example, a user may select one of the three illustrated options (e.g., the "All Fields" option 702, the "Selected Fields" option 703, or the "Coverage" option (e.g., fields with at least a specified % of coverage) 704). If the user selects the "All Fields" option 702, all of the fields identified from the events that were returned in response to an initial search query may be selected. That is, for example, all of the fields of the identified data model object fields may be selected. If the user selects the "Selected Fields" option 703, only the fields from the fields of the identified data model object fields that are selected by the user may be used. If the user selects the "Coverage" option 704, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 702 indicates that 97 fields will be selected if the "All Fields" option is selected. The "3" displayed next to the "Selected Fields" option 703 indicates that 3 of the 97 fields will be selected if the "Selected Fields" option is selected. The "49" displayed next to the "Coverage" option 704 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

Figure 8:
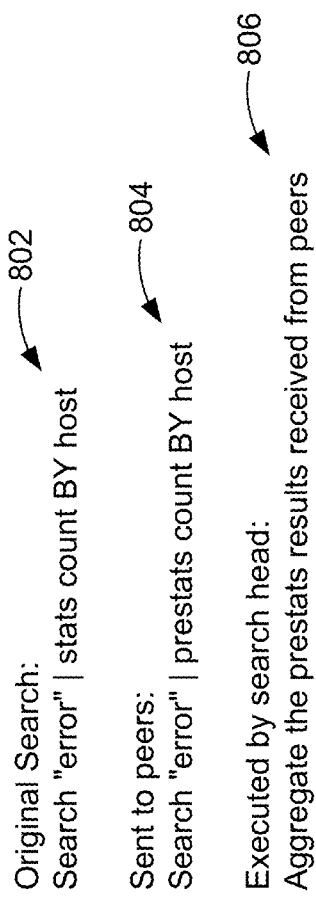
FIG. 8 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 8 illustrates how a search query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving search query 802, a search head 210 determines that a portion of the operations involved with the search query may be performed locally by the search head. The search head modifies search query 802 by substituting "stats" (create aggregate statistics over results sets received from the indexers at the search head) with "prestats" (create statistics by the indexer from local results set) to produce search query 804, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 9A:
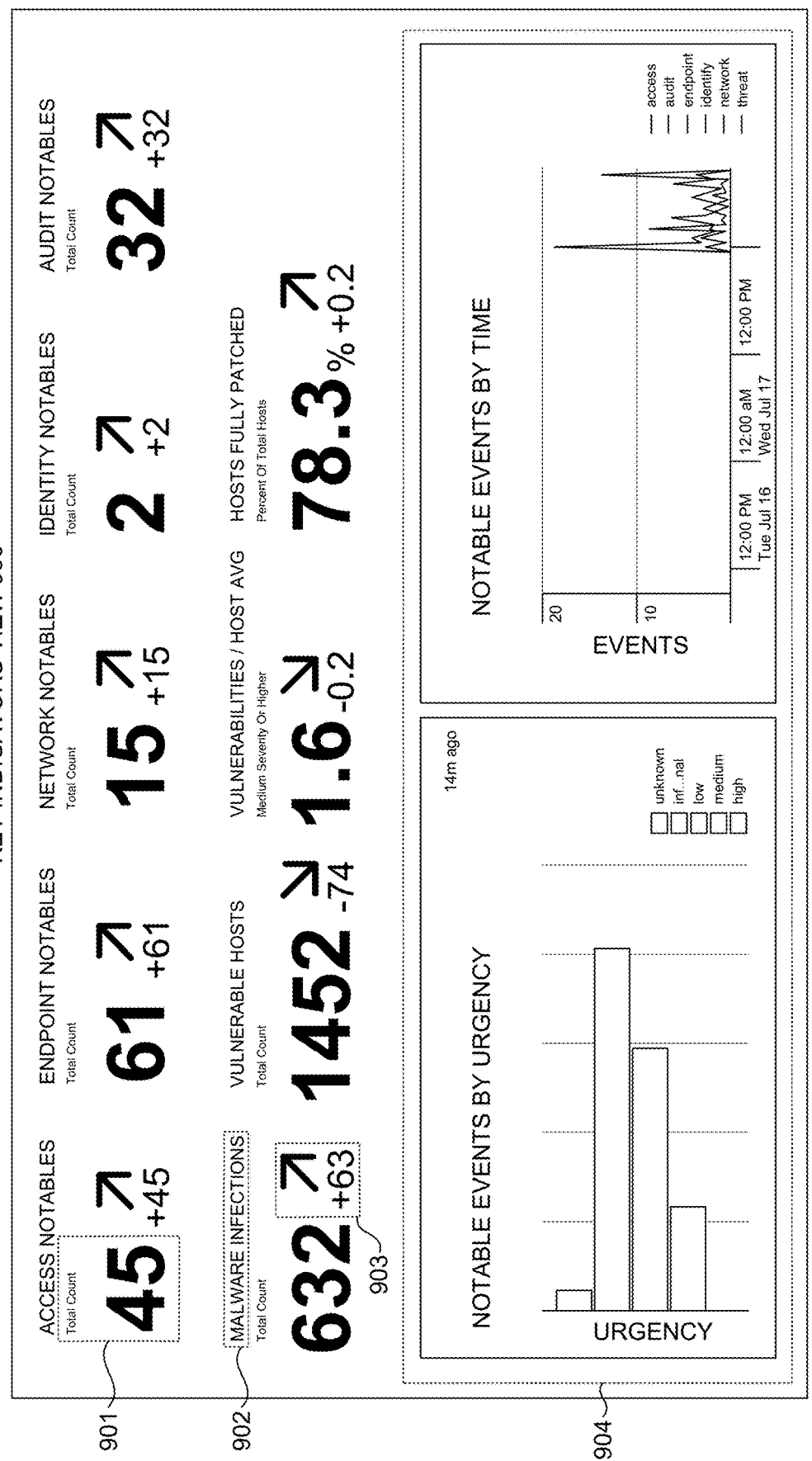
FIG. 9A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics, such as counts of different types of notable events. For example, FIG. 9A illustrates an example key indicators view 900 that comprises a dashboard, which can display a value 901, for various security-related metrics, such as malware infections 902. It can also display a change in a metric value 903, which indicates that the number of malware infections increased by 63 during the preceding interval. Key indicators view 900 additionally displays a histogram panel 904 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 9B:
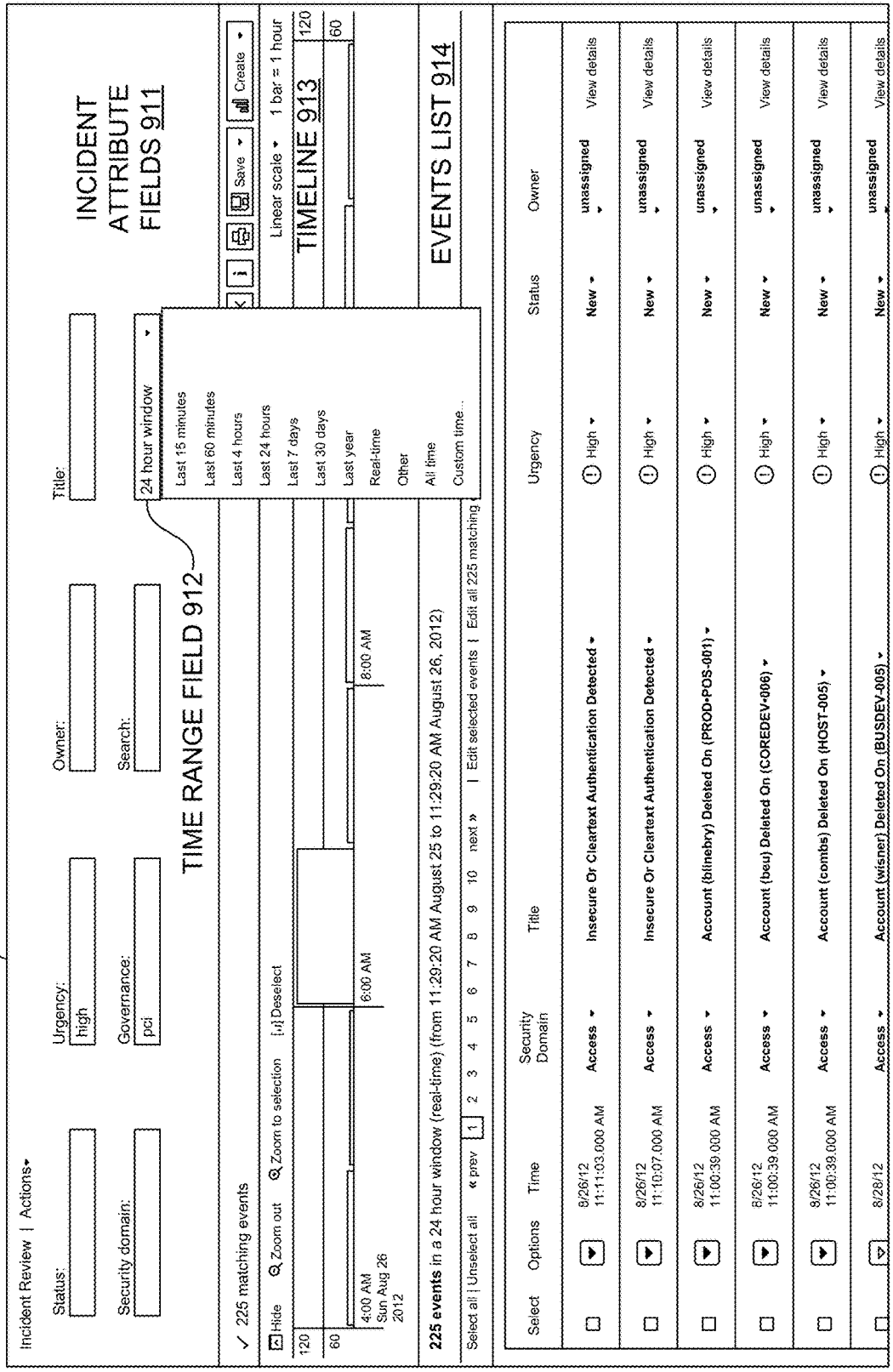
FIG. 9B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 9B illustrates an example incident review dashboard 910 that includes a set of incident attribute fields 911 that, for example, enables a user to specify a time range field 912 for the displayed events. It also includes a timeline 913 that graphically illustrates the number of incidents that occurred in time intervals over the selected time range. It additionally displays an events list 914 that enables a user to view a list of all of the notable events that match the criteria in the incident attributes fields 911. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that simplify the developers' task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, California. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 9C, wherein nodes 933 and 934 are selectively expanded. Note that nodes 931-939 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

Figure 9D:
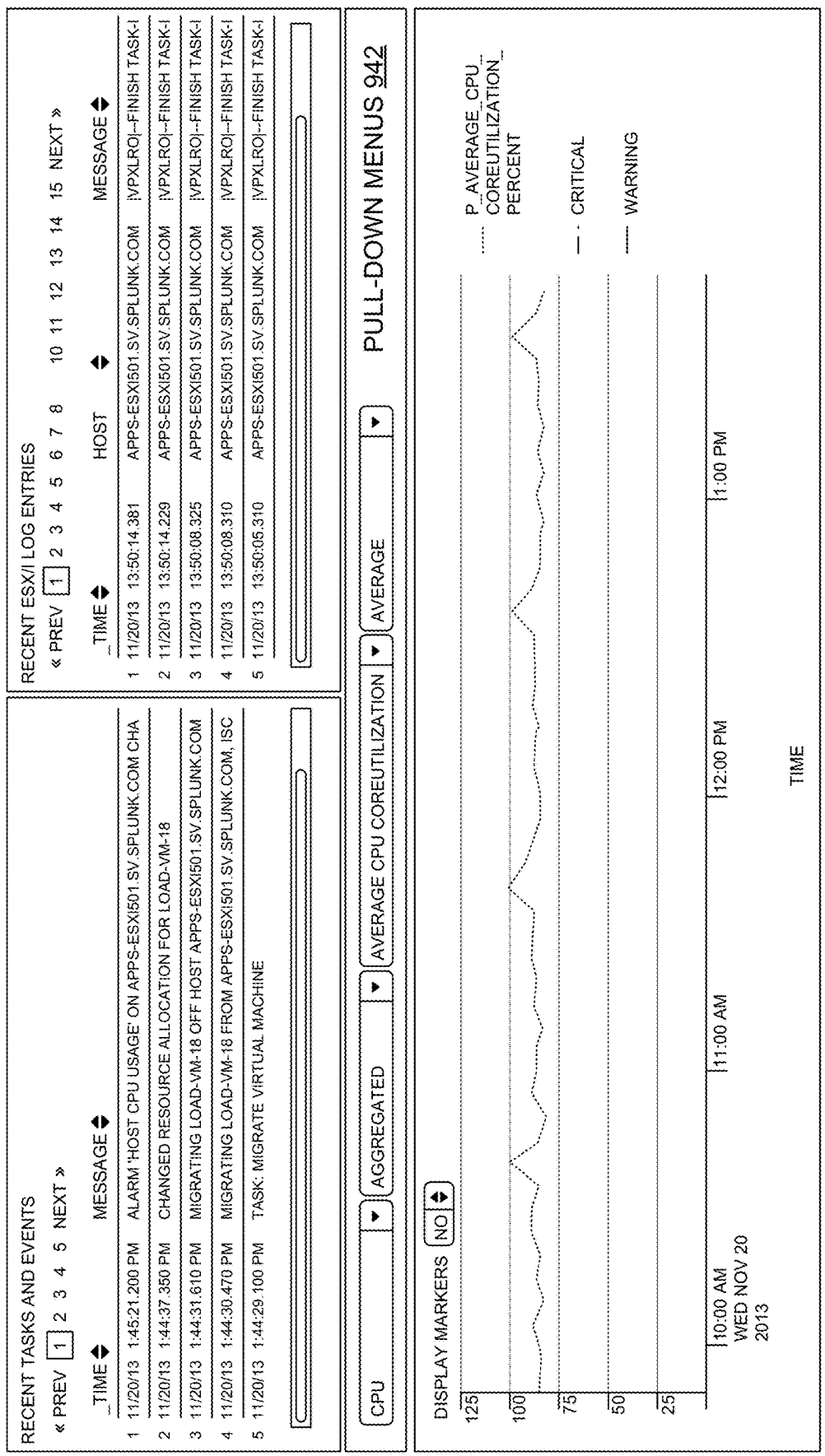
FIG. 9D illustrates a user interface screen displaying both log data and performance data in accordance with the disclosed embodiments.

The SPLUNK® APP FOR VMWARE® also provides a user interface that enables a user to select a specific time range and then view heterogeneous data comprising events, log data, and associated performance metrics for the selected time range. For example, the screen illustrated in FIG. 9D displays a listing of recent "tasks and events" and a listing of recent "log entries" for a selected time range above a performance-metric graph for "average CPU core utilization" for the selected time range. Note that a user is able to operate pull-down menus 942 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 10:
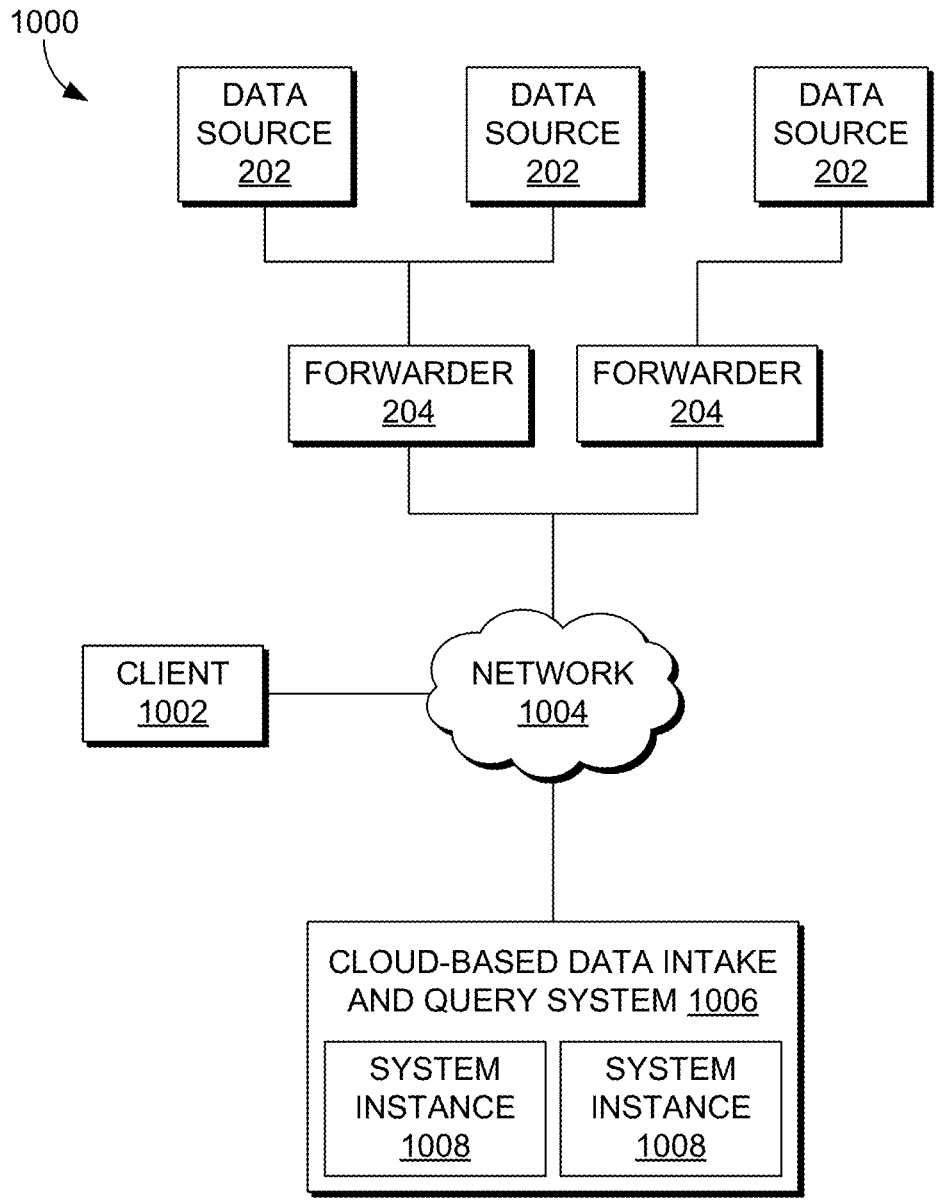
FIG. 10 illustrates a block diagram of an example cloud-based data intake and query system in which an embodiment may be implemented.

FIG. 10 illustrates a block diagram of an example cloud-based data intake and query system. Similar to the system of FIG. 2, the networked computer system 1000 includes input data sources 202 and forwarders 204. These input data sources and forwarders may be in a subscriber's private computing environment. Alternatively, they might be directly managed by the service provider as part of the cloud service. In the example system 1000, one or more forwarders 204 and client devices 1002 are coupled to a cloud-based data intake and query system 1006 via one or more networks 1004. Network 1004 broadly represents one or more LANs, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.14. Searching Externally Archived Data

Figure 11:
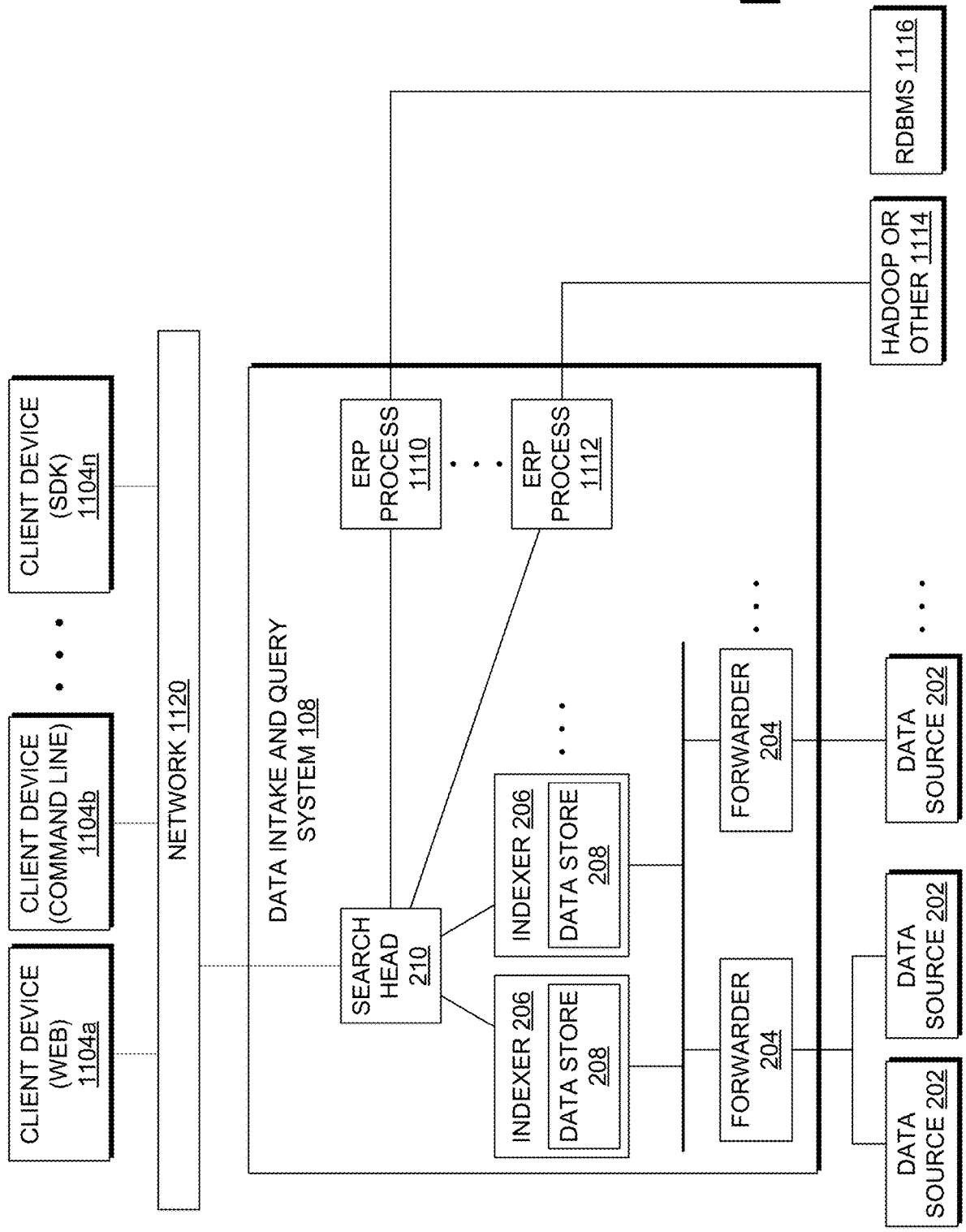
FIG. 11 illustrates a block diagram of an example data intake and query system that performs searches across external data systems in accordance with the disclosed embodiments.

FIG. 11 shows a block diagram of an example of a data intake and query system 108 that provides transparent search facilities for data systems that are external to the data intake and query system. Such facilities are available in the HUNK® system provided by Splunk Inc. of San Francisco, California. HUNK® represents an analytics platform that enables business and IT teams to rapidly explore, analyze, and visualize data in Hadoop and NoSQL data stores.

The search head 210 of the data intake and query system receives search requests from one or more client devices 1104 over network connections 1120. As discussed above, the data intake and query system 108 may reside in an enterprise location, in the cloud, etc. FIG. 11 illustrates that multiple client devices 1104a, 1104b, . . . , 1104n may communicate with the data intake and query system 108. The client devices 1104 may communicate with the data intake and query system using a variety of connections. For example, one client device in FIG. 11 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1104 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1110, 1112. FIG. 11 shows two ERP processes 1110, 1112 that connect to respective remote (external) virtual indices, which are indicated as a Hadoop or another system 1114 (e.g., Amazon S3, Amazon EMR, other Hadoop Compatible File Systems (HCFS), etc.) and a relational database management system (RDBMS) 1116. Other virtual indices may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1110, 1112 receive a search request from the search head 210. The search head may optimize the received search request for execution at the respective external virtual index. Alternatively, the ERP process may receive a search request as a result of analysis performed by the search head or by a different system process. The ERP processes 1110, 1112 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1110, 1112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate search requests in the protocol and syntax of the respective virtual indices 1114, 1116, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, or internetworks using any of wired, wireless, terrestrial microwave, satellite links, etc., and may include the public Internet.

The analytics platform utilizing the External Result Provider process is described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.14.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the]streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.15. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational' . . . . Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, California.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

3.1. Search Head Cluster Environment

Figure 12:
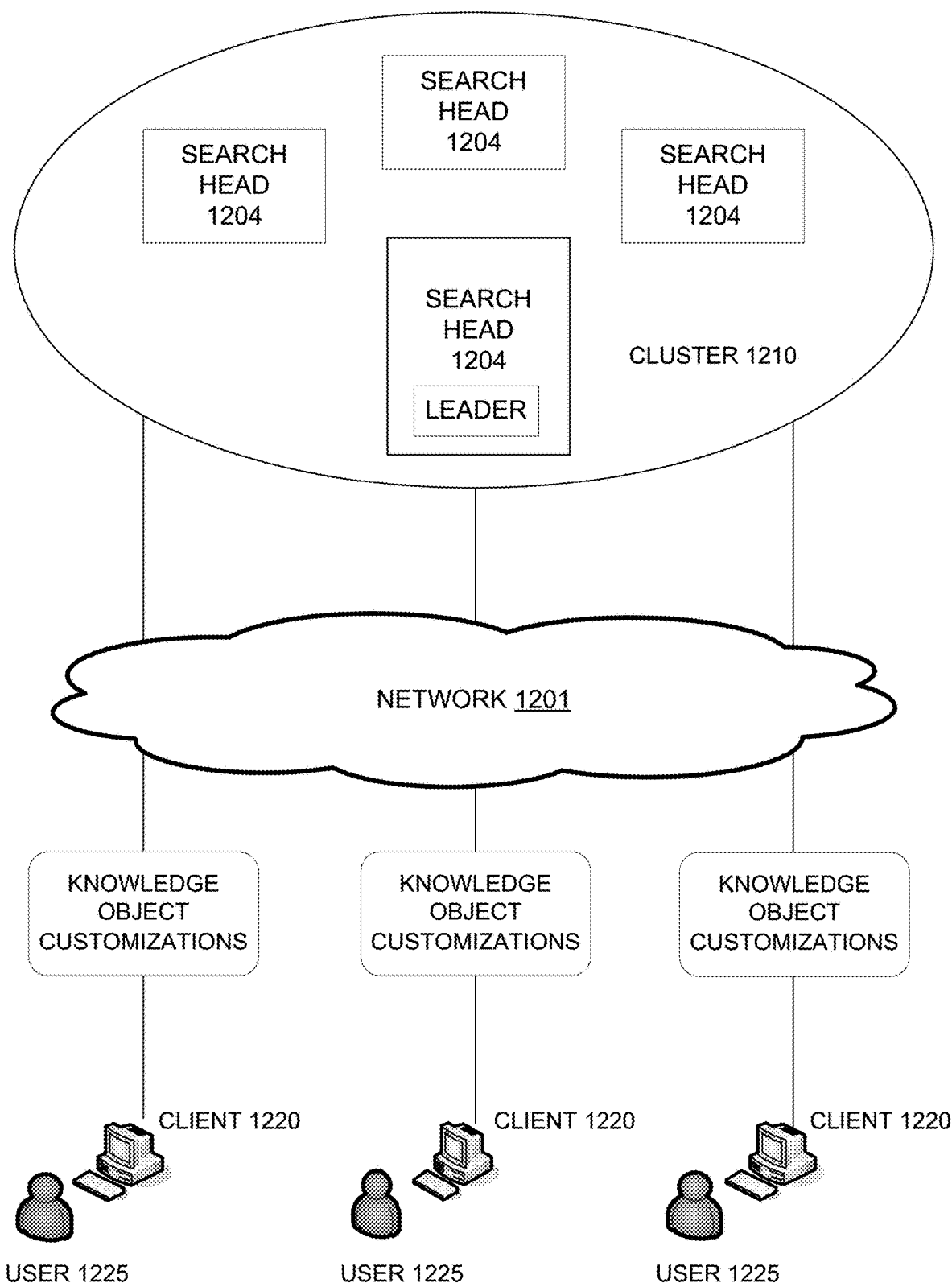
FIG. 12 schematically illustrates an example environment for replicating user-defined configuration customizations across a cluster of search heads, in accordance with the disclosed embodiments.

FIG. 12 presents a functional block diagram of a distributed system 1200. The system 1200 includes a cluster 1210 of multiple search heads 1204 accessible by a number of clients 1220 over a network 1201. Although FIG. 12 illustrates an example including four search heads 1204 and three clients 1220, it is to be appreciated that the system 1200 may include any number of search heads 1204 and any number of clients 1220.

The search heads 1204 may be, for example, server devices located at one or more sites, each site being geographically remote from the other site (e.g., in different cities). In an embodiment, all of the search heads 1204 may be located at a single site. In another embodiment, at least two of the search heads 1204 are located at a single site and at least one other of the search heads 1204 of the cluster 1210 is located at a different site. In another embodiment, each search head 1204 of the cluster 1210 is located at a different site.

The search heads 1204 may receive instructions to perform tasks from the clients 1220 on behalf of one or more users 1225. For example, one of the search heads 1204 may receive a request from one of the clients 1220 to perform a search-related activity, such as a map-reduce search or a search using late-binding schema as described in detail below. In response to receiving the request to perform the search-related activity, the search head 1204 may perform the search.

According to embodiments of the present disclosure, the search heads 1204 may receive instructions from the clients 1220 to perform a knowledge object customization (i.e., a customization of a search-related or visualization-related configuration). A customization may include any action relating to a knowledge object, such as, for example, the deletion, creation, modification, change, or update of a knowledge object. A knowledge object is a configuration relating to search, visualization, or other system activity. As such, a knowledge object can be a configuration of an activity that is permissible or controlled via an access control layer of the system. A knowledge object can be customizable by a user.

Exemplary knowledge objects include, but are not limited to, a saved search, an event type, a transaction, a tag, a field extraction, a field transform, a lookup, a workflow action, a search command, a view, and late-binding schema. Although various exemplary knowledge objects are described below, it is noted that other knowledge objects (search-related or visualization-related configurations) may be customized in accordance with embodiments of the present disclosure.

In an embodiment, a view is a knowledge object representing a customizable user interface accessible by a user 1225. In an embodiment, dashboards and forms are examples of views. In an embodiment, a view may be built from user interface components such as search boxes, fields, charts, tables, and lists. A view may be permissible and may be applied to specific application. A dashboard may be a static or dynamic (e.g., real-time) visualization of data. In an embodiment, a view may defined via user-specified HTML, "custom" XML formats, or the like.

In an embodiment, a saved search is a knowledge object representing a search that has been made available for later use. For example, searches may be saved for producing a report, an alert or a dashboard panel.

In an embodiment, an event type is a knowledge object that enables a user to categorize and label all indexed events that match a specified search string (e.g., a search query or search criteria). An event type may have a name and an associated search query or search criteria. A user may create an event type directly or use a device to identify and create an event type. For example, the user may use a device such as a typelearner (i.e., a utility that helps a user create event types, examines events resulting from a search, and suggests event types), an event type finder (i.e., a 'findtypes' command may be appended to a search to cause the search results to display as a breakdown of the most common groups of events found in the search results), or an event type builder (i.e., a utility or tool configured to dynamically create event types based on an analysis of a selected event).

In an embodiment, a transaction is a knowledge object representing a group of conceptually-related events that span time. For example, events grouped together by a transaction often represent a complex, mult-istep business-related activity, such as all events related to a single hotel customer reservation session, or a customer session on a retail website. A user may use a 'transaction' command to find transactions based on a transaction definition (e.g., a transaction definition created by the user ad hoc) or to locate transactions based on a previously configured transaction type. In an embodiment, boundaries for transactions may be explicitly timespan-related, such as, for example, a transaction definition that requires that the first and last events in the transaction be no more than 30 seconds apart and the events within the transaction be no more than 5 seconds apart. In an embodiment, transaction boundaries may be defined without explicitly setting maximum timespans or event pauses. For example, a user may define a transaction for an online store called "item purchase" that looks for groups of events that share the same 'sessionid' 'clientip' field values, have a starting event with the string "signon", and an ending event with the string "purchase." This exemplary transaction produces grouping of events that spans time.

In an embodiment, a tag is a knowledge object that enables a user 1225 to efficiently search for events that contain particular field values. In an embodiment, a user 1225 can assign one or more tags to any field/value combination, including, for example, event types, hosts, sources, and source types. In an embodiment, tags enable the user 1225 to track abstract field values like IP addresses or ID numbers. For example, a user 1225 may have a number of field values related to the user's home office, including an IP address such as 192.168.1.2. In this example, the user 1225 may tag these values "homeoffice" and then perform a search on "tag=homeoffice" to identify the events with field values that have the homeoffice tag.

In an embodiment, tags enable a user 1225 to group sets of related field values together. For example, if a user 1225 has two hosts that relate to the same computing device, the user 1225 may assign the two computing devices the same tag to allow the user 1225 to search on events coming from both hosts using the common tag.

In an embodiment, tags enable a user 1225 to assign extracted fields multiple tags that reflect different aspects of their identity. Accordingly, the user 1225 may create tag-based searches that use Boolean operators to narrow down on specific event sets.

In an embodiment, a field extraction is a knowledge object representing both a process by which fields are extracted from event data and the results of the extraction process (i.e., extracted fields). In an example, field extraction may take place either before events are indexed (e.g., in the case of default and indexed fields) or after event indexing (e.g., in the case of search fields). In an embodiment, a set of default fields may be automatically extracted for each indexed event. In an example, a user 1225 may "create" additional "custom" fields by defining additional index-time and search-time field extractions. A user 1225 may perform manual field extraction through the use of search commands, an extraction tool (e.g., interactive field extractor configured to enable a user 1225 to create custom fields dynamically while searching), and configuration files. A late-binding schema includes such field extractions, as each one may define a particular field and how to determine a value for the field from the events for which the field is defined.

In an embodiment, a transform or field transform is a knowledge object representing a transformation of an event. For example, a field transform may be used for an advanced type of search-time field extraction wherein a user 1225 wants to perform one or more of the following: (i) use the same regular expression across multiple source types, sources, or hosts; (ii) perform special formatting on the extracted field values; and (iii) extract fields from the values of another key field. In an embodiment, a transform may be involved in the setup of custom index-time field extractions. In an embodiment, a user 1225 may create transforms that mask sensitive data in events, such as customer credit card numbers. A transform may be involved in the creation of a lookup, as well as overrides of default host and source type values. In an additional example, a transform may be used to route event data to alternate indexes and forward raw event data to a third-party system.

In an embodiment, a lookup is a knowledge object that enables the addition of fields and related values to search results based on field matching (e.g., using a CSV table or a Python script). For example, a user 1225 may use a lookup to perform DNS or reverse DNS lookups on IP addresses or host names in the user's data. In an embodiment, a lookup may be incorporated into a dashboard or other application views presented by the system.

In an embodiment, a workflow action is a knowledge object that enables interactions between indexed fields in events and other web resources, including external web resources. For example, a workflow action may be defined to be associated with an IP address field in a user's search results or used to perform an external WHOIS lookup based on a particular value of that field in a specific event. In another example, a workflow action may be defined to use the field values in an HTTP error event to create a new entry in an external issue tracking system. In a further example, a workflow action may be defined to perform an external search (e.g., using a third party search engine or other web application) on the value of a field in an event. In another example, a workflow action may be defined to launch secondary searches that use one or more field values from selected events.

In an embodiment, a workflow action may be defined that is targeted to events that contain a particular field or set of fields, or which belong to a specific event type. A workflow action may be defined to open either in the current window or a new one when selected. In an embodiment, a workflow action may appear in field menus, event menus, or both (e.g., in search results).

In an embodiment, a search command or command is a knowledge object representing an element of search language used to interact with data maintained by the system. The search language may define many commands that allow a user 1225 to interact with the system and refine and modify search results. Examples of search commands include, but are not limited to, "stats," "sort," and "where". In an embodiment, a user 1225 may expand upon the system's default search language by creating custom search commands that carry out specialized interactions.

3.2. Configuration Storage Environment

Figure 13:
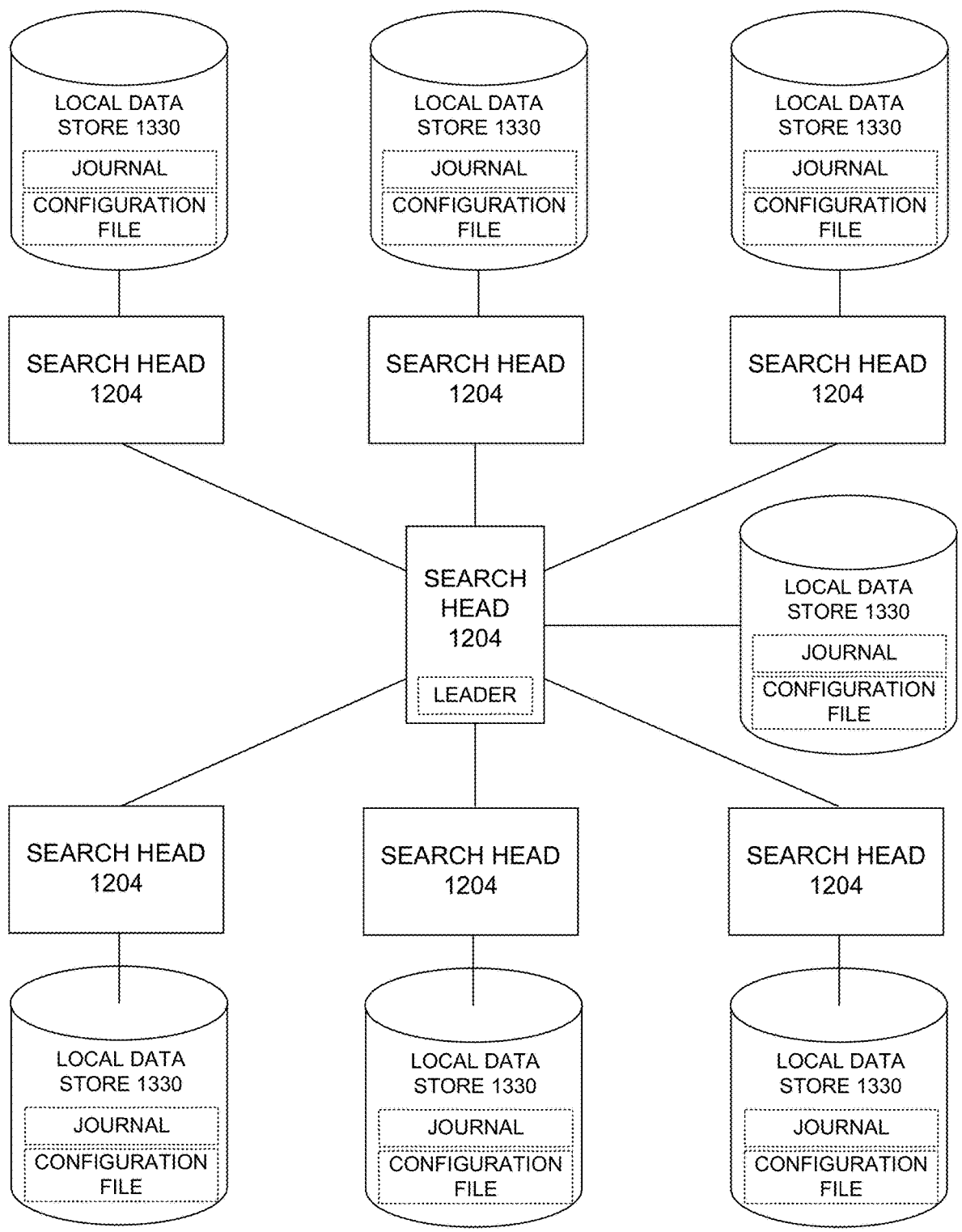
FIG. 13 schematically illustrates an example cluster of search heads, each including a local data store storing a journal and configuration file, in accordance with the disclosed embodiments.

FIG. 13 illustrates an example cluster of search heads 1204 each including a local data store 1330 storing a journal and configuration file, in accordance with one or more aspects of the present disclosure. In an embodiment, a configuration file (also referred to as a "conf file") is a file containing system configuration information including, but not limited to, knowledge objects and knowledge objects customizations. In an embodiment, a search head 1204 writes configuration settings (e.g., knowledge object customizations) into its respective configuration file stored in the local data store 1330 of the individual search head. In such embodiments, each local data store 1330 may be local relative to, associated with, or accessed only by its respective search head 1204.

In an embodiment, configuration replication is performed to synchronize the data structures of the multiple configuration files of the individual search heads across the cluster of search heads such that changes (e.g., user-initiated knowledge object customizations) made on one search head are applied on all search heads in the cluster. In an embodiment, a user interface enabling a user to perform search-related activities, submit knowledge object customizations and interact with the search heads of the cluster may be provided. Advantageously, knowledge object customization and corresponding change or alteration to an individual configuration file of one search head may be presented to a user via the user interface of another search head in the cluster.

In an embodiment, knowledge object customizations made via the user interface associated with an individual search head (e.g., a Command Line Interface (CLI), a Representational State Transfer (REST) application programming interface (API), etc.) are journaled or recorded in a journal maintained in a local data store 1330 of the individual search head 1204. In an embodiment, the journal is in-memory or on-disk and stored in the local data store 1330 repository including a history of knowledge object customizations (e.g., a list of recent configuration customization operations) performed by the corresponding search head 1204, wherein each knowledge object customization is recorded as a journal entry. For example, each journal entry includes information relating to the knowledge object customization, including, but not limited to, a knowledge object location (e.g., user/application context, asset type, asset name, etc.), a knowledge object customization type or action (e.g., creation, modification, move, edit, remove, delete, share, change permissions, etc.), and a knowledge object customization payload (e.g., a key-value pair relating to the creation of a new knowledge object customization, a new location relating to a moving of a knowledge object customization, a new access control list relating to a sharing/permission change).

In an embodiment, a knowledge object customization made by an individual search head 1204 is recorded as a journal entry in the journal stored in the local data store 1330 of the individual search head 1204. The individual search head 1204 writes the knowledge object customization to its local configuration file stored in the local data store 1330.

During a synchronization phase including a "pull" stage and a "push" stage, an individual search head communicates with the search head leader, as described in detail below with reference to FIGS. 14-16. During the "pull" stage, the individual search head receives any knowledge object customization updates from the search head leader. During the "push" stage, the individual search head sends any new journal entries to the search head leader. In an embodiment, the new journal entries include any journal entries that have not yet been sent to the search head leader.

As illustrated in FIG. 12, the exemplary cluster 1210 including the multiple associated search heads 1204 is configured in a hub-spoke arrangement, wherein one of the multiple search heads 1204 is elected as the "leader". In an embodiment, the other search heads 1204 in the cluster engage in intra-cluster communications exclusively with the search head leader 1204 (i.e., there is no follower-to-follower search head communication). It is to be appreciated that the hub-spoke arrangement represents one exemplary topology and other suitable topologies may be employed in accordance with the present disclosure.

In an embodiment, each search head 1204 may be either in a leader state or a follower state. In the leader state, the search head leader 1204 is responsible for synchronizing the knowledge object customizations across the cluster of search heads 1204. In the follower state, each individual search heads 1204 receives updates regarding knowledge object customizations performed by other search heads 1204 in the cluster and sends updates regarding knowledge object customizations performed by the individual search head 1204.

3.3. Configuration Propagation

Figure 14:
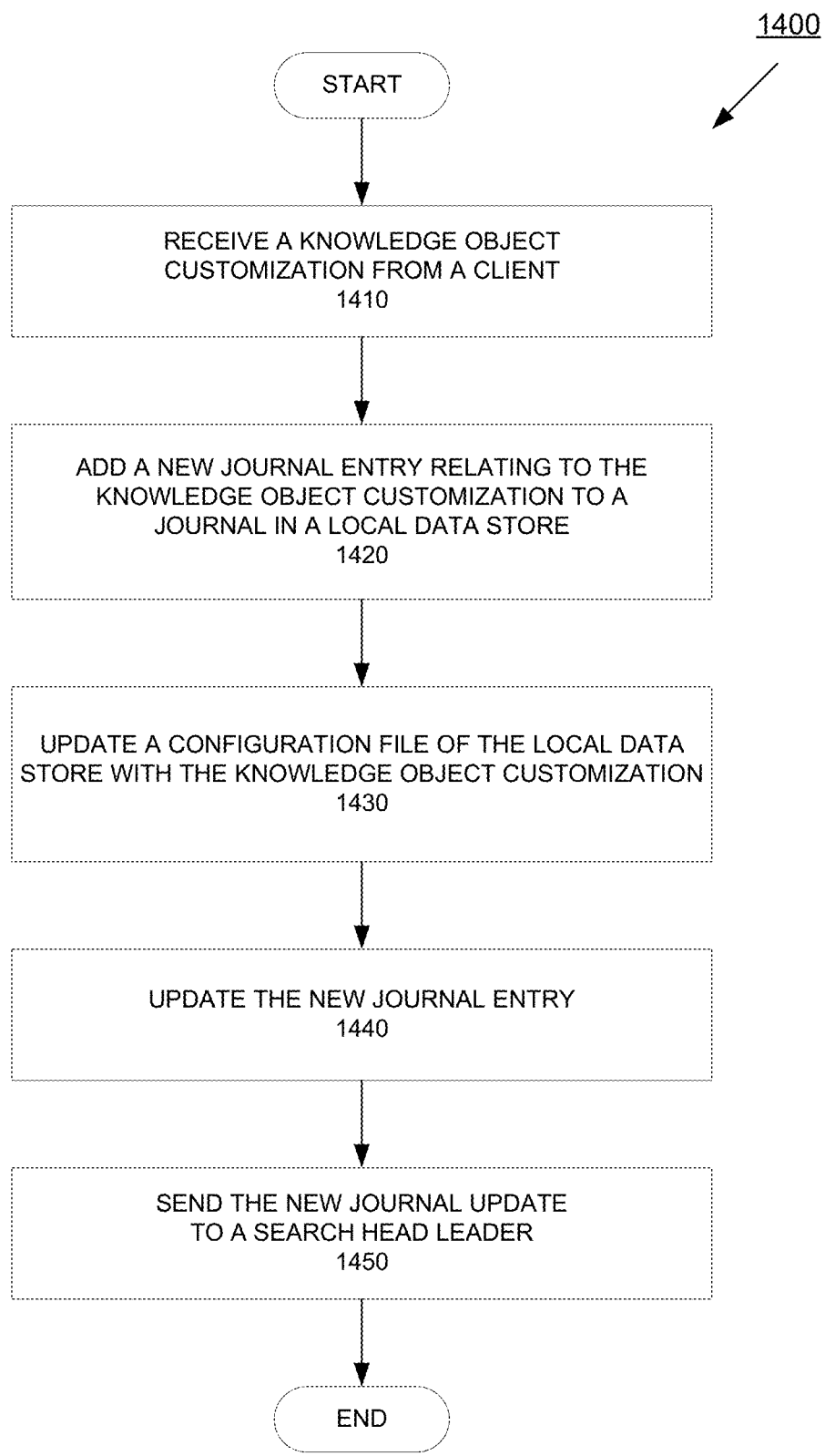
FIG. 14 presents a flowchart illustrating how a search head communicates a configuration customization applied at a local configuration file to a search head leader, in accordance with the disclosed embodiments.

FIG. 14 presents a flowchart depicting an exemplary method 1400 illustrating how an individual search head processes a knowledge object customization in accordance with the disclosed embodiments. At block 1410, a search head receives a knowledge object customization from a client device. In block 1420, the search head generates a new journal entry including information relating to the knowledge object customization and adds the journal entry to a journal stored in a local data store of the search head. In an embodiment, after adding the journal entry, the search head may mark the journal entry as "replicated but not applied." In an embodiment, the marking "replicated but not applied" may represent that the corresponding knowledge object customization has been added to the search head's journal, but not yet added or applied to the search head's configuration file.

In block 1430, the search head updates a configuration file (stored in the local data store of the search head) with the knowledge object customization. In an embodiment, the search head updates the configuration file by applying the journal entry. For example, if the journal entry relates to a knowledge object customization involving a deletion of the knowledge object, the search head deletes the respective knowledge object from the configuration file. In another example, if the journal entry is the knowledge object customization involving a creation of the knowledge object, the search head adds the respective knowledge object to the configuration file. In yet another example, if the journal entry is the knowledge object customization involving a modification to the knowledge object, the search head modifies the respective knowledge object in the configuration file. In an embodiment, in block 1440, the search head may update the corresponding journal entry in the locally stored journal by marking it as "replicated and applied." Next, if the search head is a follower search head, in block 1450, during the "push" stage of the synchronization phase, the search head sends a journal update including the journal entry to a search head leader.

In an embodiment, blocks 1420, 1430, and 1440 may be performed in any order, such that the activity relating to the journal entry (e.g., creating the journal entry, updating the journal entry, etc.) may be performed before, after, or concurrently with the updating of the configuration file. For example, in an embodiment, the search head may first update the configuration file with the knowledge object customization. Following or concurrently with the update to the configuration file, the search head may generate the new journal entry including information relating to the knowledge object customization and add the journal entry to a journal stored in a local data store of the search head. In this embodiment, the search head may record only "complete" changes (i.e., changes that have been applied and reflect in the configuration file.

In an example implementation of method 1400, a first search head (referred to as "search head 1") receives instructions relating to a knowledge object customization. In this example, the knowledge object customization involves the creation of a new saved search (referred to as "saved search A"). In an embodiment, search head 1 generates a GUID ("globally unique identifier," and herein "G1") identifying the creation of saved search A. Search head 1 then adds a journal entry (herein "J1") including information relating to G1 (e.g., the knowledge object customization identifier (G1), a parent commit or change associated with the current journal entry, information identifying the user that created G1, relevant key-value pairs, etc.) to a journal stored in a local data store of search head 1. In an embodiment, a parent commit or change represents a latest or most recent change received from the search head leader and replicated in a search head's journal. Search head 1 updates a configuration file stored in the local data store by writing saved search A to the configuration file. Next, during the push stage, search head 1 sends journal entry J1 to the search head leader.

Figure 15:
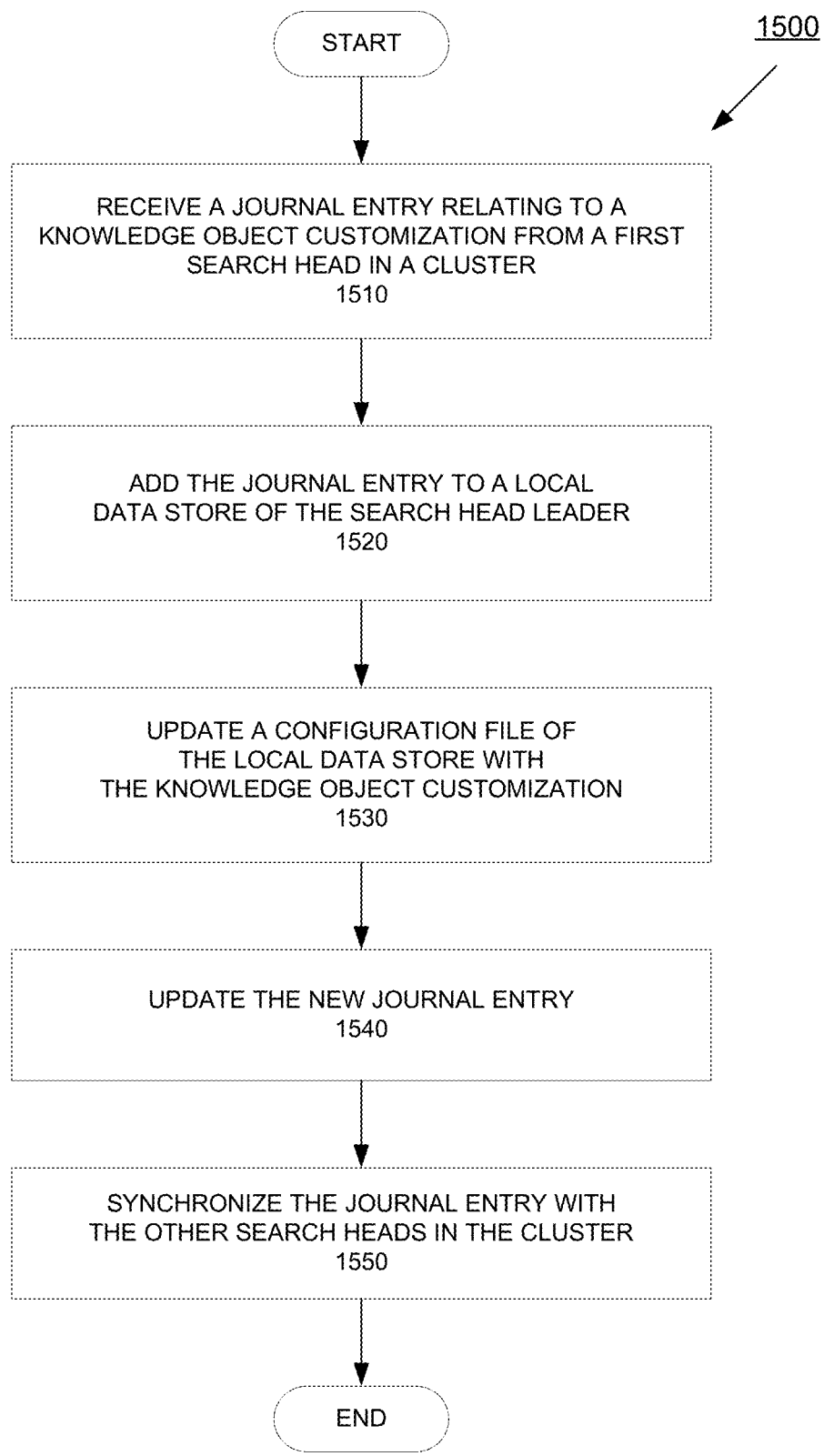
FIG. 15 presents a flowchart illustrating how a search head synchronizes a configuration customization across a cluster of search heads, in accordance with the disclosed embodiments.

FIG. 15 presents a flowchart depicting an exemplary method 1500 illustrating how a search head leader manages replication of knowledge objects across multiple follower search heads in a cluster during a synchronization phase. In block 1510, a search head leader receives a journal update including a new journal entry (e.g., journal entry J1) relating to a knowledge object customization from a first search head in a cluster. In an embodiment, the search head leader confirms that the received journal entry may be "applied cleanly" by confirming that a parent commit or change associated with the journal entry is the latest or most commit in the search head leader's journal. If the received journal entry refers to a parent commit which is the latest commit recorded in the search head's journal, the search head leader may determine that there are no intervening journal updates (i.e., from other search heads in the cluster) creating a potential merge conflict. In an embodiment, the search head leader "reconciles" the journal entry and determines there is no conflict with another journal entry received from another follower search head by confirming the parent commit (or journal entry) reference in the journal entry received from the follower search head is the latest (e.g., most current) journal entry in the search head leader's journal). An example wherein a conflict is detected among multiple knowledge object customizations and corresponding journal entries is described below in connection with FIG. 16.

In block 1520, the search head leader adds the one or more journal entry to a local data store of the search head leader. In an embodiment, the search head leader may mark the added journal entry as "replicated but not applied." In block 1530, the search head leader updates a configuration file stored in the local data store of the search head leader with the received journal entry. In an embodiment, in block 1540, following the applying of the knowledge object customization corresponding to the received journal entry to its local configuration file, the search head leader may mark the newly added journal entry as "replicated and applied." In an embodiment, the search head leader may send a communication to the follower search head indicating that the follower search head's "push" was applied successfully.

In an embodiment, blocks 1520, 1530, and 1540 may be performed in any order, such that the activity relating to the journal entry (e.g., creating the journal entry, updating the journal entry, etc.) may be performed before, after, or concurrently with the updating of the configuration file. For example, in an embodiment, the search head leader may first update the configuration file with the knowledge object customization. Following or concurrently with the update to the configuration file, the search head may generate the new journal entry including information relating to the knowledge object customization and add the journal entry to a journal stored in a local data store of the search head. In this embodiment, the search head leader records "complete" changes (i.e., changes that have been applied and reflect in the configuration file.

In block 1550, the search head leader synchronizes its journal with the other search heads in the cluster. It is noted that the synchronization of the search head leader's journal across the multiple follower search heads of the cluster may be performed at different times or at the same time. In an embodiment, the synchronization in block 1550 occurs on an individual basis with respective to the multiple search heads in the cluster. In an embodiment, block 1540 occurs for each individual search head upon receipt by the search head leader of a synchronization request for the individual search head. For example, the individual search heads may fetch or "pull" the new changes (e.g., knowledge object customizations) from the search head leader at any time.

Figure 16:
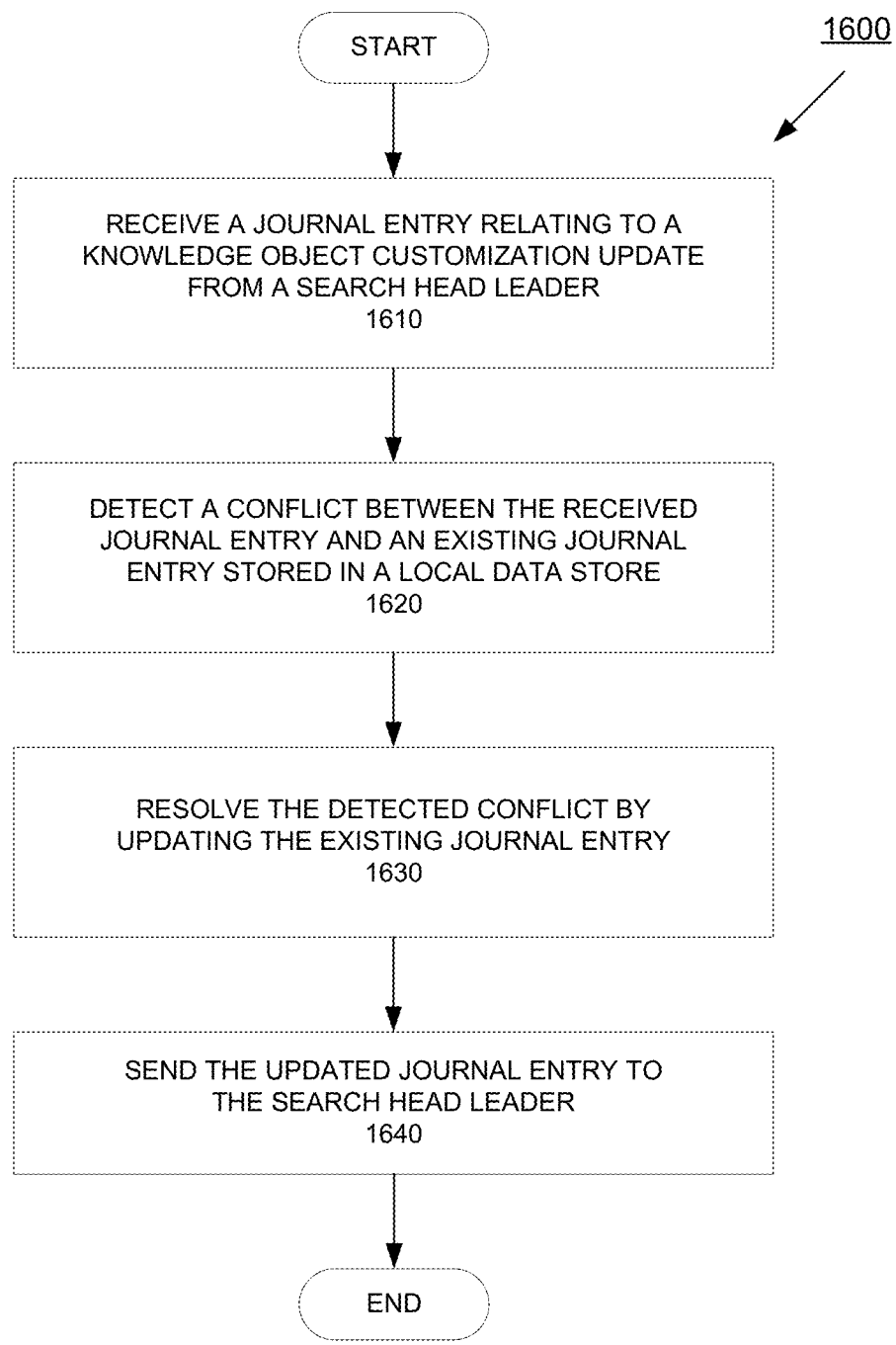
FIG. 16 presents a flowchart illustrating how a search head resolves a conflict associated with a configuration customization, in accordance with the disclosed embodiments.

FIG. 16 is a flowchart depicting an exemplary method 1600 illustrating how a search head resolves a conflict relating to the replication of knowledge object customizations. Continuing the example above, assume a second search head (herein "search head 2") of the cluster synchronizes with the search head leader and receives journal entry J1 from the search head leader. The second search head 2 adds journal entry J1 to its local journal and marks it as "replicated but not applied." Search head 2 then updates its local configuration file by applying journal entry J1. In an embodiment, search head 2 then updates its local journal by marking journal entry J1 as "replicated and applied." At this point in the example, search head 1 and search head 2 each have journal entry J1 in their respective local journals, with the latest commit or update in each local journal being journal entry J1 (relating to G1).

In the example, search head 2 may then generate a new knowledge object customization involving the editing of saved search A. In an embodiment, search head 2 generates a globally unique identifier (herein "G2") identifying the editing of saved search A. Search head 2 then adds a journal entry (herein "J2") including information relating to G2 (e.g., the knowledge object customization identifier (G2), an identification of J1 as a parent commit associated with the current journal entry, information identifying the user that created G2, relevant key-value pairs, etc.) to a journal stored in a local data store of search head 2.

In addition, in this example, search head 2 may generate a new knowledge object customization involving the creation of a new saved search (herein "saved search B"). In an embodiment, search head 2 generates a globally unique identifier (herein "G3") identifying the creation of saved search B. Search head 2 then adds a journal entry (herein "J3") including information relating to G3 (e.g., the knowledge object customization identifier (G3), an identification of J2 as a parent commit associated with the current journal entry, information identifying the user that created G3, relevant key-value pairs, etc.) to a journal stored in a local data store of search head 2.

In this example, search head 1 generates a new knowledge object customization involving the editing of saved search A. In an embodiment, search head 1 generates a globally unique identifier (herein "G4") identifying the editing of saved search A. Search head 1 then adds a journal entry (herein "J4") including information relating to G4 (e.g., the knowledge object customization identifier (G4), an identification of J1 as a parent commit associated with the current journal entry, information identifying the user that created G4, relevant key-value pairs, etc.) to a journal stored in a local data store of search head 1.

In this example, search head 2 synchronizes with the search head leader before search head 1. During the "pull" phase of the synchronization stage, search head 2 determines that it has all of the search head leader's latest commits. During the "push" phase, search head 2 sends journal entries J2 and J3 to the search head leader. The search head leader confirms that J2 and J3 are applied cleanly (i.e., there are no conflicts and the associated knowledge object customizations may be added to the search head leader's configuration files) and adds J2 and J3 to its local journal. The search head leader updates its local configuration files by applying J2 and J3 and notifies search head 2 that the push was successful.

In block 1610, a follower search head (e.g., search head 1 in this example) receives one or more journal entries relating to a knowledge object customization update from a search head leader during a "pull" stage of a synchronization phase. The search head determines if it has received and journaled all of the received journal entries provided by the search head leader. For example, when search head 1 engages in the "pull" phase of the synchronization stage, search head 1 determines it does not have all of the search head leader commits (i.e., search head 1 determines it does not have J2 and J3) and fetches or receives J2 and J3 from the search head leader.

With reference to FIG. 16, in block 1620, the search head detects a conflict between the received journal entry and an existing journal entry stored in the local journal of the search head's local data store. In an embodiment, the search head may detect a conflict if the received journal entry and the existing journal entry are sibling journal entries (i.e., the two journal entries share the same parent journal entry). In another embodiment, the search head may detect a conflict if the received journal entry and the existing journal entry apply to the same user or entity. If the existing journal entry has already been applied (i.e., added to the configuration file of the search head leader), the search head may proceed to block 1630. In this example, search head 1 detects a conflict between the received journal entry (J2) and an existing journal entry (J4) in its local journal because the two journal entries are both related to a configuration action (e.g., an edit) of saved search A.

In block 1630, the search head (e.g., search head 1) resolves the detected conflict by updating its existing journal entry to produce an updated journal entry. In an embodiment, the existing journal entry is updated such that it is effectively applied after the received journal entry by changing the existing journal entry's parent commit reference. In an embodiment, the search head adds the received journal entry to its local journal and marks the newly added journal entry as "replicated and applied."

In the example above, search head 1 determines that J2 and J4 are sibling commits (i.e., both journal entries have the same parent commit (J1)). Accordingly, search head 1 determines that J2 has already been effectively applied. In this case, search head 1 seeks to make J4 effectively apply "after" J2. Search head 1 adds J2 to its local journal and marks J2 as "replicated and applied." In addition, search head 1 adds J3 to its local journal and marks J3 as "replicated but not applied." Search head 1 then updates its local configuration files by applying J3 and updates its local journal by marking J3 as "replicated and applied." In block 1630, search head 1 resolves the detected conflict by changing J4's parent commit from J1 to J3 in its local journal.

Optionally, as shown in FIG. 16, in block 1640, the search head sends the updated journal entry to the search head leader. In an embodiment, the "push" phase of the process wherein the search head sends one or more updated journal entries to the search head leader may be performed following the conflict resolution in block 1630, or at any later time during a separate synchronization with the search head. In the example above, search head 1 sends J4 to the search head leader. In an embodiment, the search head leader confirms that J4 applies cleanly. The search head leader adds J4 to its local journal and marks J4 as "replicated but not applied." The search head leader further updates its local configuration files by applying J4 and updates its journal by marking J4 as "replicated and applied." In an embodiment, the search head leader notifies search head 1 that its push was successful. Next, when search head 2 later synchronizes with the search head leader, search head 2 determines it does not have all of the search head leader commits and fetches J4.

In an embodiment, search head 2 confirms that J4 applies cleanly (i.e., that J4's parent commit (J3) is the latest commit in the search head leader's journal). Search head 2 then adds J4 to its local journal and marks J4 as "replicated but not applied." Search head 2 updates its local configuration files by applying J4 and updates its local journal by marking J4 as "replicated and applied."

In this stage in the example, search head 1, search head 2 and the search head leader each have journal entries J1-J4 in their respective local journals, with the latest commit in each search head's journal being J4/G4. In addition, all of the search heads' local configuration files contain the "J4 version" of saved search A and the "J3 version" of saved search B.

The configuration replication and propagation system is described in more detail in U.S. patent application Ser. No. 14/448,919, entitled "CONFIGURATION REPLICATION IN A SEARCH HEAD CLUSTER", filed on 31 Jul. 2014, which is hereby incorporated by reference in its entirety for all purposes.

3.3.1. Search Head Specific Propagation

In one or more embodiments, the search head leader propagates the customizations received from the member search heads to other member search heads in the cluster as described in FIGS. 14-16. In one or more embodiments, propagation is performed during the synchronization step (e.g., in response to the "pull" operation initiated by a member search head), wherein the search head leader propagates the most recent knowledge object customizations in its journal to other member search heads. However, propagating all or even a portion of the knowledge object customizations in the journal of a search head leader to each member search head becomes increasingly inefficient—potentially prohibitively so—as the number of knowledge object customizations scales. In order to reduce the amount of data that is transmitted during the synchronization/propagation operations, embodiments of the present disclosure provide solutions for determining the divergence between the journals of each member search head and the journal of the search head leader.

Figure 17:
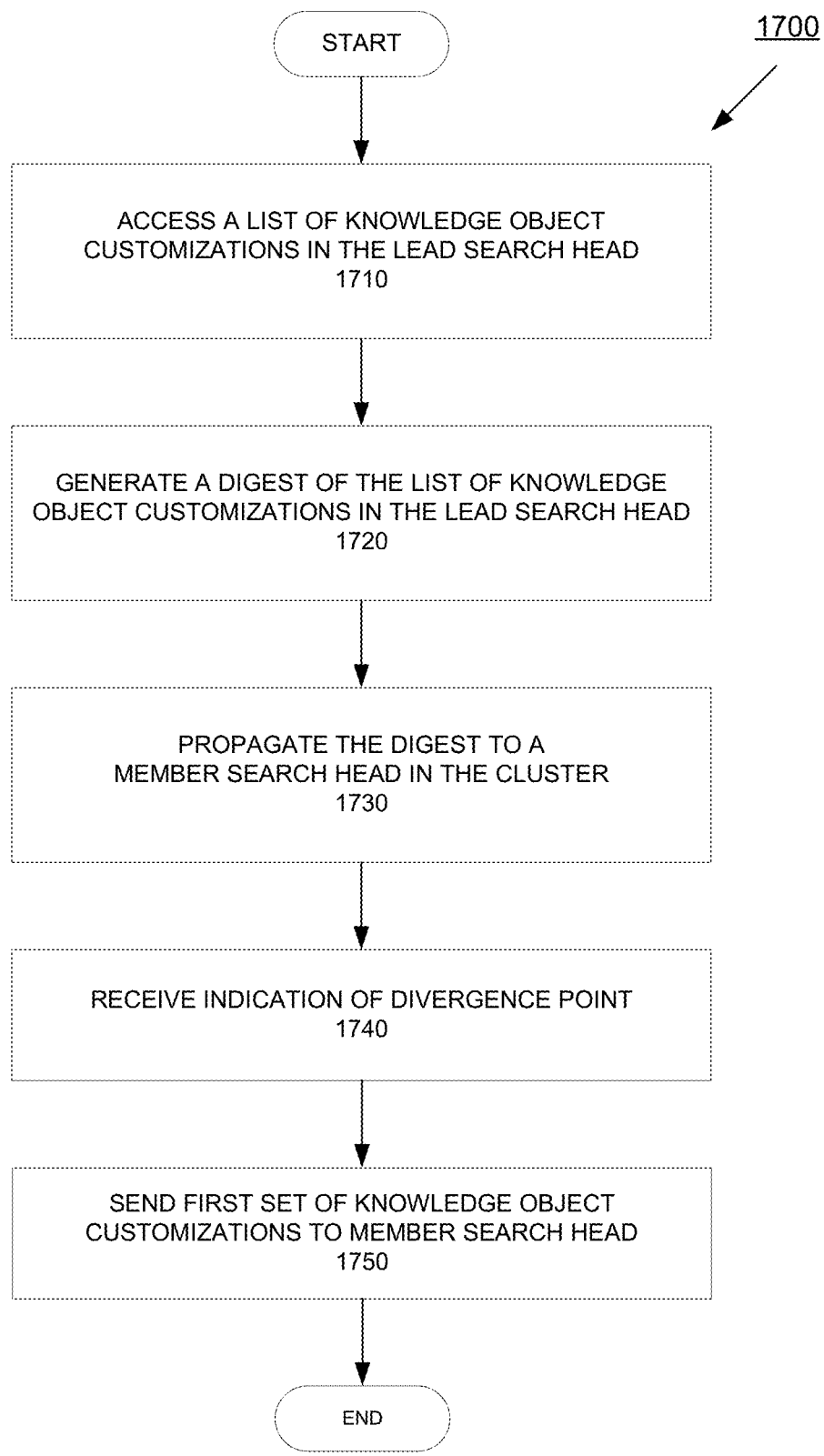
FIG. 17 presents a flowchart illustrating how a search head leader communicates a specific configuration customization update to a member search head, in accordance with the disclosed embodiments.

Once the point or origin of divergence is determined for a member search head and reported to the search head leader, the search head leader need only send the knowledge object customizations in its journal after the divergence point to completely update that particular member search head. FIG. 17 presents a flowchart depicting an exemplary method 1700 illustrating how knowledge object customization updates are propagated in a cluster of search heads using divergence determination. Blocks 1710-1750 describe exemplary steps comprising the process 1700 depicted in FIG. 17 in accordance with the various embodiments herein described. In one embodiment, the process 1700 is implemented at least in part as computer-executable instructions stored in a computer-readable medium and executed in one or more processing devices.

At block 1710, a first search head in a search cluster accesses a list of knowledge object customizations in a data store. In one or more embodiments, the first search head is the search head leader and the data store is a local data store on one or more processing devices upon which the search head leader is implemented. In one or more embodiments, the knowledge object customizations from the list of knowledge object customizations corresponds, for example, to one or more of the knowledge object customizations described above with respect to FIG. 14-16.

Specifically, each knowledge object customization may correspond to a separate knowledge object customization submitted by one or more client devices, received in one or more member search heads of the search cluster, and replicated to the first (leader) search head. In one or more embodiments, rather than the actual knowledge object customization data itself (which may be stored in a corresponding configuration file), the list of knowledge object customizations is implemented as a journal of customization records that includes customization details along with corresponding globally unique identifiers (GUIDs), each GUID being uniquely associated with (and used to identify) a different and specific knowledge object customization. In one or more embodiments, block 1710 may be performed in response to, for example, a "pull" request submitted from a second (member) search head in the search cluster.

At block 1720, a digest (or other reduced size representation) of the journal of the search head leader is generated. In one or more embodiments, the digest is implemented as a one dimensional array of values (e.g., a bitmask), by applying one or more hash functions to the GUIDs in the local journal of the search head leader. In a specific embodiment, the digest is implemented as a Bloom filter comprising a bit array of m bits and a pre-determined number k of different defined hash functions, each of which maps a GUID to one of the m array positions with a uniform random distribution. The bits of the Bloom filter are initially set to 0, and for each GUID in the journal of the search head leader, each of the k hash functions are applied to the GUID to get one or more corresponding k addresses in the Bloom filter. The bit at each of the resulting k addresses in the array is thereafter changed to 1, and the presence (or absence) of GUIDs can subsequently be queried as will be described below. In one or more embodiments, the actual number k of hash functions is proportional to the number of m elements of the Bloom filter and adjustable to increase or decrease an intended rate of false positives of the Bloom filter. Once the Bloom filter has been populated with the hashed values of the GUIDs of the journal, the array of bit values (bitmask) is propagated to one or more member search heads at block 1730.

At block 1740, a divergence point between the journal of the search head leader and the journal of a member search head is determined using the bitmask propagated at block 1730 and an indication of the divergence point is received in the search head leader. In one or more embodiments, the divergence point is determined to be the earliest point of divergence (i.e., where the journals of the search head leader and the member search head are no longer synchronous), and the indication of the divergence point may consist of, for example, an address in the bitmask of the Bloom filter corresponding to the most recent GUID prior to the point of divergence, a corresponding position of the GUID in the local journal of the search head leader, the hash values of the GUID, or the GUID itself.

The search head leader then determines the position in its journal corresponding to the indication of the divergence point received at block 1740, and sends the knowledge object customizations in the local journal of the search head leader that was recorded subsequent (chronologically) to the point of divergence to the member search head at block 1750. Since the portions of the respective journals of the search head leader and member search head were synchronized before the divergence point, communicating the knowledge object customizations prior to the divergence point would be redundant, and the search head leader needs only to propagate the knowledge object customizations which were recorded in the journal of the search head leader after the divergence point to synchronize with the journal of the member search head. By sending only the knowledge object customizations after the point of divergence, the propagation of configuration data is improved by transmitting a portion of data customized for the particular member search head, thereby eliminating the transmission of redundant knowledge object customization data and significantly reducing the amount of data transferred overall.

Figure 18:
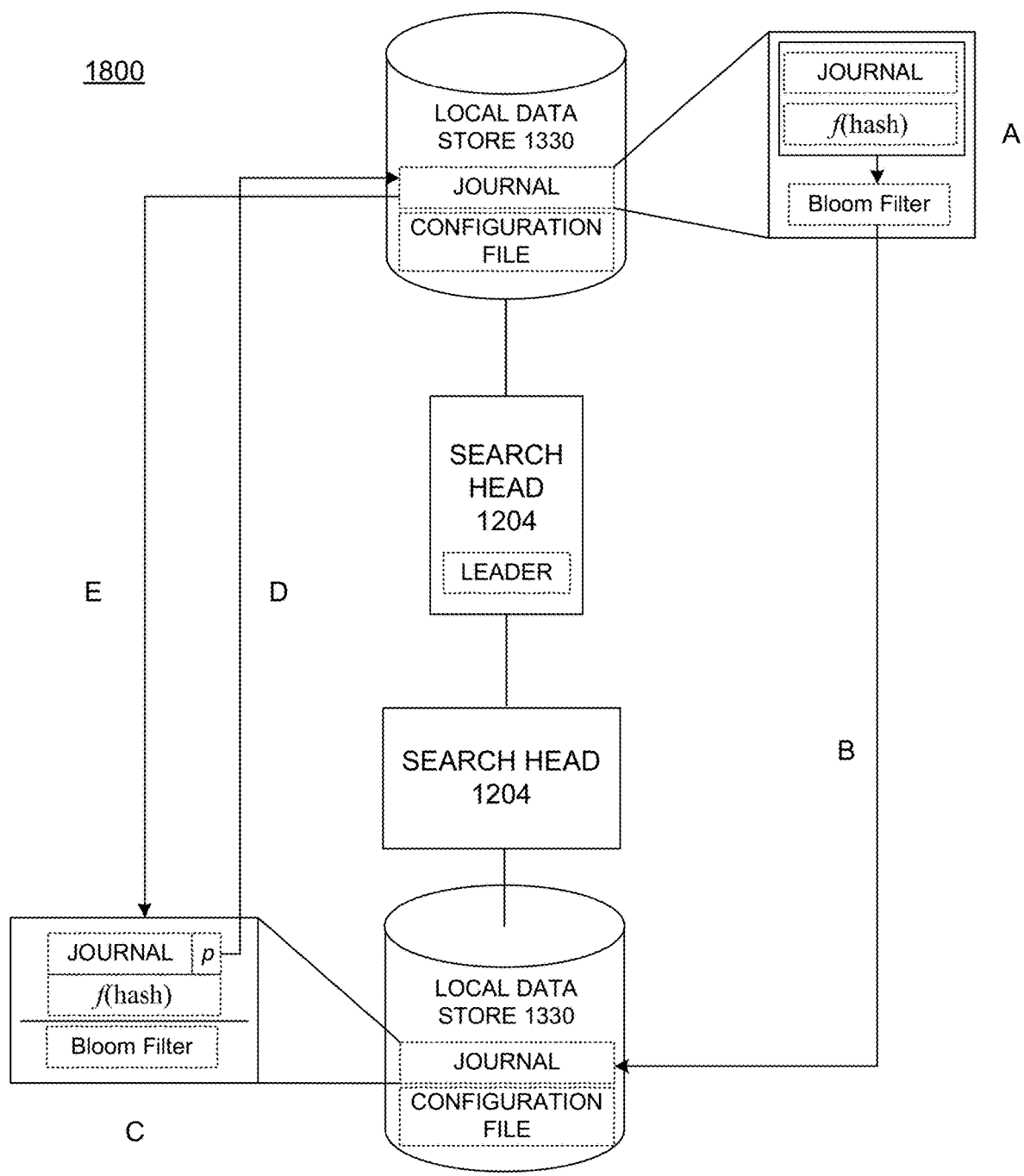
FIG. 18 presents a chronological flow diagram illustrating the interaction of components in a search cluster during a determination of a divergence point, in accordance with the disclosed embodiments.

FIG. 18 presents a flow diagram 1800 illustrating the interaction of components in a search cluster during a determination of a divergence point, in accordance with the disclosed embodiments. Specifically, FIG. 18 depicts the components involved and the chronological flow of data during a specific embodiment of the performance of steps 1710-1750 in a process for communicating configuration customization updates from a search head leader, as described above with respect to FIG. 17. As presented in FIG. 18, one or more hash functions (ƒ(hash)) are applied to the local journal of the local data store 1330 relative to a search head leader 1204 to generate a Bloom Filter at Time A. A bitmask (bit array) representing the Bloom Filter is propagated to the journal of a member search head 1204 at Time B. The same hash functions (ƒ(hash)) are then applied to the journal of the member search head and the addresses derived are compared to the Bloom Filter at Time C until an element (e.g., a GUID) in the journal of the member search head is determined to be missing from the addresses in the Bloom Filter derived after applying the one or more hash functions to the GUID. This pointp of divergence (i.e., asynchronicity) is then communicated to the search head leader at Time D, and the knowledge object customizations of the journal local to the search head leader that were recorded relative (i.e., subsequent) to the position in the journal corresponding to pointp are propagated to the member search head at Time E. In one or more embodiments, the same flow of data is performed by the search head leader in combination with each of member search head in the search cluster continuously at pre-determined intervals, according to a pre-determined order, or subject to a specified trigger event.

Embodiments of the present disclosure have been described with reference to digests and other reduced-size representations generated as or using Bloom filters. Relative to other filtering techniques and data structures, Bloom filters are relatively space and time efficient to generate and maintain. As such, to continue addressing processing requirements as they scale, a new Bloom filter may be generated when the optimal filtering capacity of previous Bloom filter(s) has been exhausted to maximize the information content (i.e., storing as many GUIDs as possible) while maintaining an acceptable false positive rate.

Figure 19:
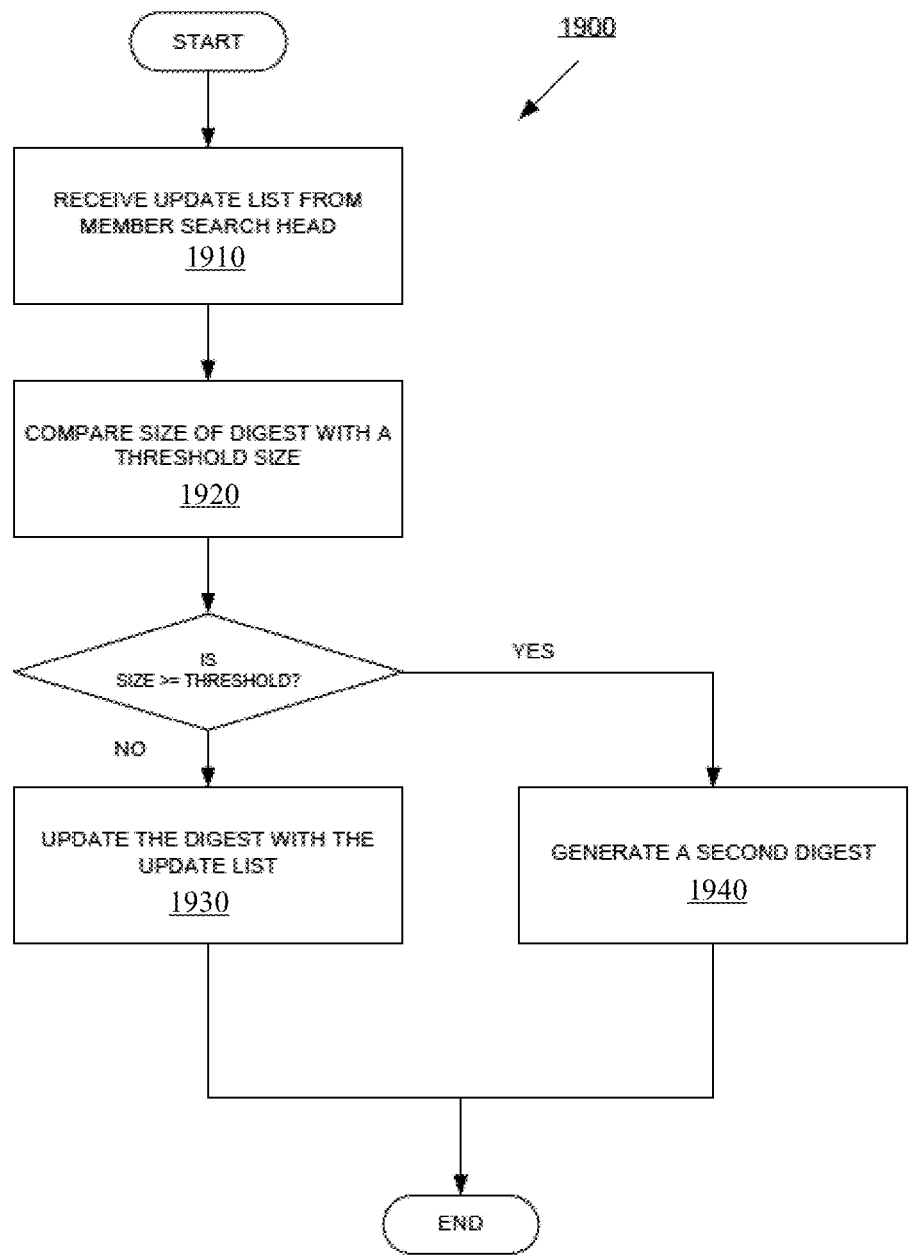
FIG. 19 presents a flowchart illustrating how a size of a local list of knowledge configuration customizations in the search head leader is managed, in accordance with the disclosed embodiments.

FIG. 19 presents a flowchart illustrating how a size of a local list of knowledge configuration customizations in the search head leader is managed, in accordance with the disclosed embodiments. Blocks 1910-1940 describe exemplary steps comprising the process 1900 depicted in FIG. 19 in accordance with the various embodiments herein described. In one embodiment, the process 1900 is implemented at least in part as computer-executable instructions stored in a computer-readable medium and executed in one or more processing devices.

At block 1910, an update list of knowledge object customizations is received in a search head leader. In one or more embodiments, the update list of knowledge object customizations may generated locally in the search head leader from a remote client device, or alternate, can be sent from a member search head during a "push" operation of a synchronization phase, as described above with respect to FIGS. 14-16. The update list may, for example, consist of knowledge object customizations submitted from a client computing device to the member search head that has not been recorded in the search head leader or propagated to other member search heads of the cluster.

At block 1920, a current size of the digest (e.g., Bloom filter) is compared to a threshold. In one or more embodiments, the size of the digest is measured as the number of the current population of elements (e.g., GUIDs) in the digest or a remaining capacity. In one or more embodiments, the threshold is a pre-determined threshold that corresponds to a (predetermined) intended false positive rate. Thus, exceeding the threshold has the potential to cause the Bloom filter to produce false positives at a rate that is higher than intended/acceptable. If the current size of the digest is less than the threshold (i.e., the remaining capacity is greater than a capacity threshold), the GUIDs of the knowledge object customizations from the update list are added to the digest at block 1930. In one or more embodiments, adding the GUIDs may be performed by adding the GUIDs to the Bloom filter by hashing the GUID values as described above. In one or more embodiments, block 1920 is performed by comparing the size of the digest including the size of the update list or remaining capacity of the digest after the addition of the update list) with the pre-determined threshold. In one or more embodiments, the threshold may comprise a range of sizes.

If the current size of the digest is determined at block 1920 to be greater than the size threshold (or if the remaining capacity of the digest is determined to be less than a capacity threshold), the process proceeds to block 1940, whereupon a second digest is generated. In subsequent interactions, propagation of knowledge object customizations performed by the search head leader across search heads in the cluster may be performed by sending both the first digest and second digest to member search heads to determine a point of divergence.

Alternately, the search head leader may send only the second digest if divergence points have been determined to correspond to GUIDs within the second digest. In one or more embodiments, the second digest may have a initial size substantially equivalent to the initial size of the first digest. That is, the second digest may be implemented as a second bit array having an equal or substantially equal length to the first bit array of the first digest. In alternate embodiments, the second digest may have a variable size depending on scaling patterns and behaviors.

3.3.2. Divergence Determination

Once a search head leader sends a digest of the local journal of the search head leader to a member search head, the point of divergence between the journal of the search head leader and the local journal of the member search head is determined. In one or more embodiments, the point of divergence is determined by querying the presence or absence of the GUIDs in the journal of the member search head in the digest. According to specific embodiments, the potential presence or the definite absence of a GUID can be determined by implementing the digest as a Bloom filter, hashing the GUIDs in the journal of the member search head to determine addresses in the bitmask array of the Bloom filter, and referencing the address values (bit values) of the bitmask at the addresses generated from the application of the hash functions. In one or more embodiments, the presence/absence of the GUIDs in the journal of the member search head can be performed iteratively.

Figure 20:
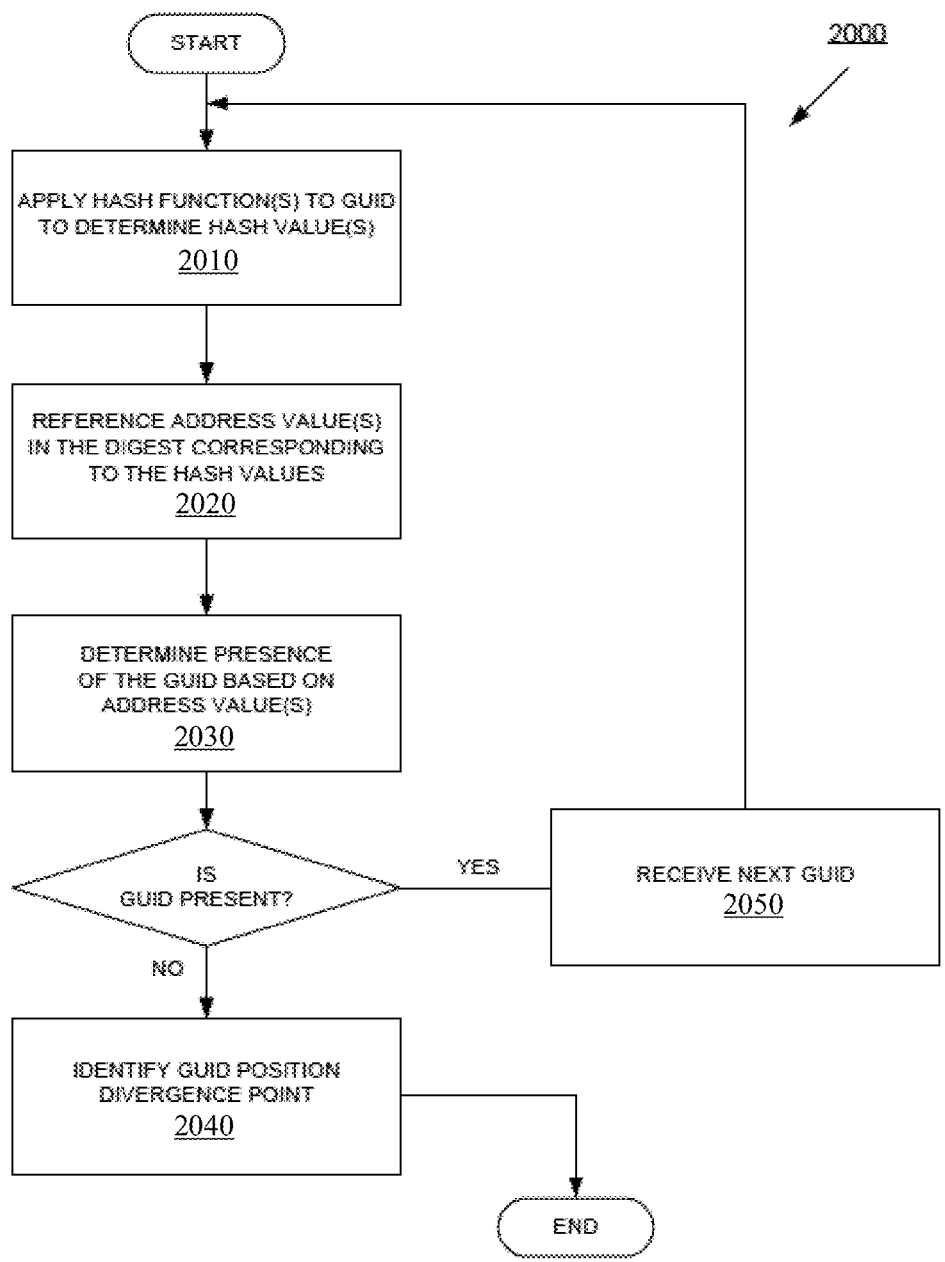
FIG. 20 presents a flowchart illustrating how to iteratively identify a divergence point between the journal of a member search head and the journal of a search head leader, in accordance with the disclosed embodiments.

FIG. 20 presents a flowchart illustrating how to iteratively identify a divergence point between the journal of a member search head and the journal of a search head leader, in accordance with the disclosed embodiments. Blocks 2010-2050 describe exemplary steps comprising the process 2000 depicted in FIG. 20 in accordance with the various embodiments herein described. In one embodiment, the process 2000 is implemented at least in part as computer-executable instructions stored in a computer-readable medium and executed in one or more processing devices.

At block 2010, one or more hash functions are applied by a member search head to a GUID in the local journal of the member search head to determine a corresponding one or more hash values. In one or more embodiments, the one or more hash functions correspond to the same one or more hash functions used to generate the digest (e.g., a Bloom filter) in the search head leader. According to various embodiments, the one or more hash functions may be pre-determined, previously communicated, or sent to the member search head along with the digest.

In one or more embodiments, the hash values correspond to addresses in an array (bitmask) representing the digest. At block 2020, the bit values at the addresses determined at block 2010 in the bitmask are referenced. The determination of the (potential) presence or absence of the GUID is performed at block 2030. The presence or absence of the GUID may be determined according to the following: 1) if any of the bits at resulting addresses in the bitmask is 0, the GUID is determined to be definitely not in the digest; 2) if all of the bits at the resulting addresses are determined to be 1, then either the GUID is in the set or the bits of the bitmask were set to 1 during the insertion of other GUIDs, and the result is a false positive.

If a GUID is determined to definitely not be in the digest by the performance of blocks 2020 and 2030, the position of the GUID in the local journal of the member search head is identified as the point of divergence and the information is relayed to the search head leader at block 2040. Such information may comprise, for example, information that identifies the GUID immediately preceding the divergence point (i.e., the last shared GUID between the respective journals of the search head leader and member search head). Subsequently, the search head leader determines the position in its local journal corresponding to the last shared GUID, and sends all subsequent knowledge object customization data (e.g., GUIDs and configuration data) to the member search head. Once received, the knowledge object customization data is used to update the journal and configuration file in the member search head, and the member search head is again synchronized with the search head leader.

If instead the GUID is determined to potentially be present in the digest through the performance of blocks 2020 and 2030, the process proceeds to block 2050, where the next GUID in the local journal is retrieved, and blocks 2010 through 2050 are repeated. In one or more embodiments, the sequence of blocks 2010 through 2050 can be repeated iteratively for each GUID in the local journal of the member search head until the divergence point is determined (i.e., until a GUID is determined to be absent). Additionally, blocks 2010-2050 can be performed for all member search heads in the cluster, with each member search head determining a respective divergence point, communicating the divergence point to the search head leader, receiving a customized update list of knowledge object customizations specific to the member search head, and updating a local journal or configuration file with the information in the update list. In one or more embodiments, the performance of steps 2010 to 2050 can be performed for each member search head periodically at pre-determined intervals or in response to a trigger event. In still further embodiments the order in which process 2000 is performed among the member search heads follows a cyclical (e.g., round robin) format.

3.3.3. False-Positive Reduction Techniques

An inherent characteristic of Bloom filters is the potential for false positives in response to search queries. A false positive is undesirable when using Bloom filters to synchronize knowledge object customizations in a search head cluster since the location of a divergence point may be inaccurately determined to be later than the actual point of divergence, which may prevent the search head leader from propagating every knowledge object customization necessary to ensure synchronization. Embodiments of the present disclosure provide techniques for reducing the rate of false positives for embodiments of the present disclosure that use Bloom filters while still maintaining or maximizing the information content in a digest (or other reduced-size representation).

Figure 21:
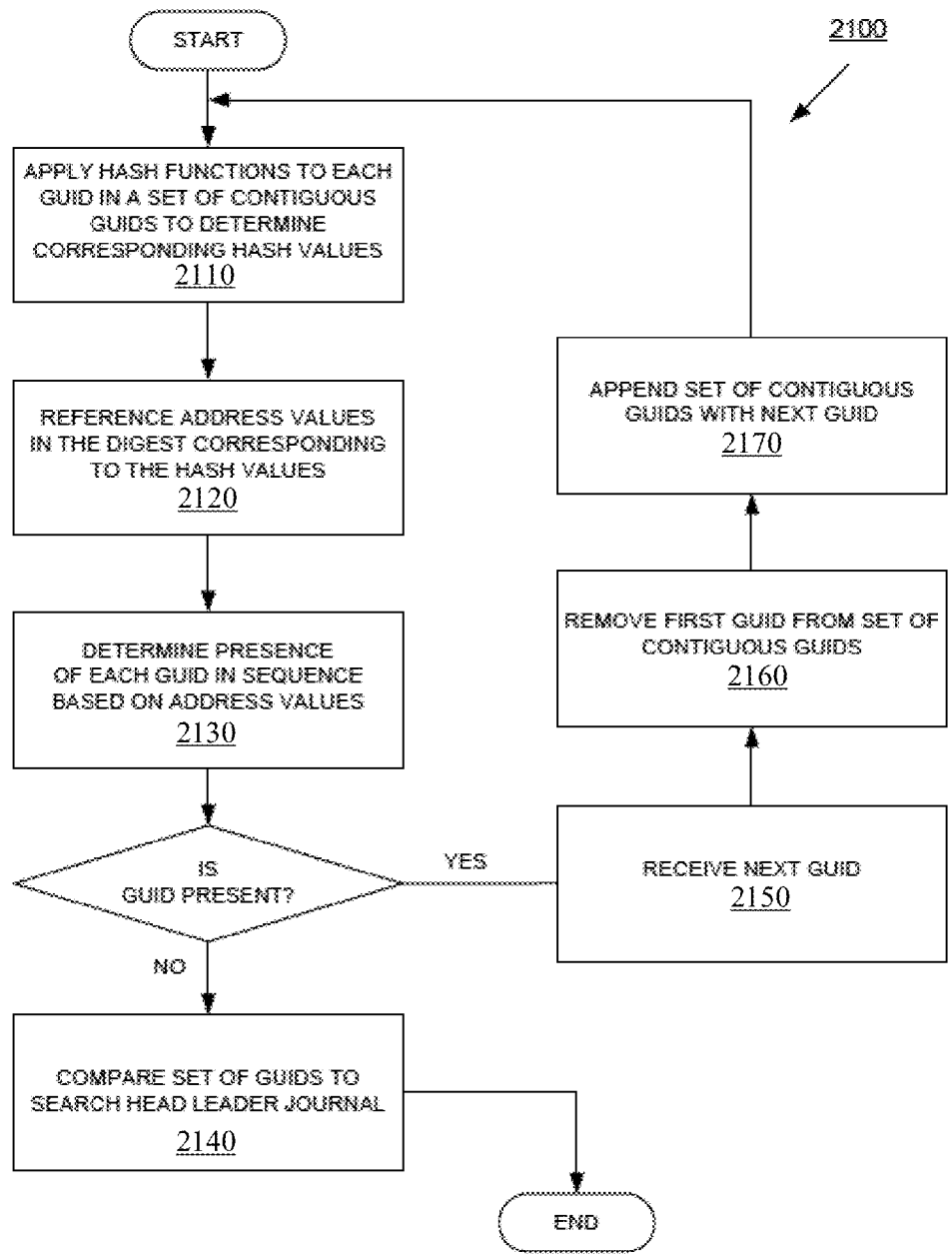
FIG. 21 presents a flowchart illustrating how to iteratively identify a divergence point between the journal of a member search head and the journal of a search head leader with a dynamic window of contiguous configuration customizations, in accordance with the disclosed embodiments using

FIG. 21 presents a flowchart illustrating how to iteratively identify a divergence point between the journal of a member search head and the journal of a search head leader with a dynamic window of contiguous knowledge object customizations, in accordance with the disclosed embodiments. Blocks 2110-2170 describe exemplary steps comprising the process 2100 depicted in FIG. 21 in accordance with the various embodiments herein described. In one embodiment, the process 2100 is implemented at least in part as computer-executable instructions stored in a computer-readable medium and executed in one or more processing devices.

In one or more embodiments, reducing the false positive rate can be performed by incorporating in the comparison between journals a contiguous sequence of GUIDs in each journal to determine a divergence point, rather than considering each GUID individually, since the probability of consecutive false positives over a contiguous sequence of queries is substantially less than the discrete probability of any single false positive result, and false positive results. Blocks 2110-2150 are similar to blocks 2010-2050 described above with respect to FIG. 20, but applied to all GUIDs in a set of GUIDs. Thus, at block 2110, the set of one or more hash functions are applied to each GUID in the set of GUIDs, and corresponding one or more hash values (addresses) for each GUID in the set is determined.

At block 2120, the addresses in the digest corresponding to the hash values determined at block 2110 are referenced, and the presence of all GUIDs in the entire set is determined based on the bit values at the addresses in the digest. If any GUID in the set is determined to be absent from the digest, this indicates the presence of a point of divergence in that set of GUIDs, and the set of GUIDs is then compared in block 2140 to the corresponding sequence of elements in the list of knowledge object customizations in the search head leader to identify the point of divergence, and if no GUIDs in the set are determined to be absent, the next GUID in the journal is received, with process 2100 being repeated iteratively for each GUID in the local journal of the member search head.

In one or more embodiments, the set of GUIDs being considered in any one query can be implemented as having a constant size during the determination of a divergence point. According to these specific embodiments, once the next GUID in the journal is received (by reference to the local journal, for example) the first (earliest) GUID in the set of GUIDs is removed from the set at block 2160 and the next GUID in the journal (received in block 2150) is appended to the end of the set of GUIDs at block 2170, and blocks 2110 through 2170 are iteratively repeated for each GUID remaining in the local journal of the member search head until a GUID is determined to be absent.

In this manner, a contiguous, moving "window" or block of GUIDs of a constant size is maintained and used to evaluate and identify the divergence point. In one or more embodiments, to populate the initial set of GUIDs, each GUID can be iteratively added to the set (with the entire set being iteratively evaluated) until the set reaches the pre-determined size. Since each GUID in the set has been previously evaluated and determined to be present in the digest (with a reduced probability of a false positive), the assurance the first absent GUID being the point of divergence is high.

As with blocks 2010 through 2050 of process 2000 described above, blocks 2110-2170 can be performed for all member search heads in the cluster, with each member search head determining a respective divergence point, communicating the divergence point to the search head leader, receiving a customized update list of knowledge object customizations specific to the member search head, and updating a local journal or configuration file with the information in the update list. In one or more embodiments, the performance of steps 2110 to 2170 can be performed for each member search head periodically at pre-determined intervals or in response to a trigger event. In still further embodiments the order in which process 2100 is performed among the member search heads follows a cyclical (e.g., round robin) format.

What is claimed is:

1. A method comprising:
  accessing, by one or more processing devices corresponding to a first search head of a cluster comprising a plurality of search heads of a data aggregation and analysis system, a first list of knowledge object customizations corresponding to the first search head;
  propagating a digest of the first list of knowledge object customizations corresponding to the first search head to a second search head of the cluster;
  receiving an indication of a first divergence point determined between the first list of knowledge object customizations and a second list of knowledge object customizations corresponding to the second search head based on a comparison of the digest with the second list of knowledge object customizations, the first divergence point corresponding to a first position in the first list of knowledge object customizations; and
  based on the divergence point, sending a first set of knowledge object customizations from the first list of knowledge object customizations to the second search head.

2. The method of claim 1, wherein the first set of knowledge object customizations comprises at least one knowledge object customization from the first list of knowledge object customizations relative to a position in the first list of knowledge object of the first divergence point.

3. The method of claim 1, wherein the first list of knowledge object customizations comprises a journal of knowledge object customizations locally stored with respect to at least one processing device of the one or more processing devices corresponding to the first search head.

4. The method of claim 1, wherein the second list of knowledge object customizations corresponding to the second search head comprises a journal of knowledge object customizations locally stored with respect to at least one processing device of one or more processing devices corresponding to the second search head.

5. The method of claim 1, wherein propagating the digest comprises generating the digest by applying a Bloom filter to the first list of knowledge object customizations.

6. The method of claim 1, wherein the first list of knowledge object customizations comprises a list of global unique identifiers (GUIDs), each knowledge object customization of the first list of knowledge object customizations corresponding specifically to a respective GUID of the list of GUIDs.

7. The method of claim 1, wherein the digest comprises a bitmask generated by applying a Bloom filter to a list of global unique identifiers (GUID) values corresponding to the first list of knowledge object customizations.

8. The method of claim 1, wherein the sending the first set of knowledge object customizations comprises:
sending a first set of knowledge object customizations comprising at least one knowledge object customization positioned in the first list of knowledge object customizations relative to the first divergence point to the second search head; and
updating, in the second search head, the second list of knowledge object customizations with the first set of knowledge object customizations.

9. The method of claim 1, further comprising:
propagating the digest to a third search head of the cluster;
receiving an indication of a second divergence point determined between the digest and a third list of knowledge object customizations corresponding to the third search head, the second divergence point corresponding to a second position in the digest; and
sending a second set of knowledge object customizations from the first list of knowledge object customizations to the third search head, wherein the second set of knowledge object customizations comprises knowledge object customizations from the first list of configurations after a position in the first list of configurations corresponding to the second divergence point.

10. The method of claim 1, wherein generating the digest comprises:
receiving an update list of knowledge object customizations from the second search head, the update list comprising at least one knowledge object customization from the second list of knowledge object customizations absent from the digest;
comparing a current size of the digest with a pre-determined threshold size;
updating the digest and the first list of knowledge object customizations to include the knowledge object customizations comprised in the update list when the current size of the digest is less than a pre-determined threshold size; and
generating a second digest based on the update list when the size of the digest meets or exceeds the pre-determined threshold size.

11. The method of claim 1, wherein the first divergence point is determined by:
applying one or more hash functions to a first global unique identifier (GUID) corresponding to a first knowledge object customization of the second list of knowledge object customizations to determine a corresponding one or more hash values;
referencing one or more addresses in the digest corresponding to the one or more hash values to determine one or more corresponding address values, wherein the one or more address values are indicative of the presence or absence of the first GUID in the digest;
determining a presence or absence of the first GUID in the digest based on the one or more address values; and
calculating the divergence point to be a position in the second list of knowledge object customizations corresponding to a position of the first GUID if the first GUID is absent from the digest.

12. The method of claim 1, wherein the first divergence point is determined by:
applying, to a set of global unique identifiers (GUIDs) corresponding to a pre-determined number of knowledge object customizations of the second list of knowledge object customizations, one or more hash functions to each of the set of GUIDs to determine a corresponding one or more hash values for each GUID of the set of GUIDs;
referencing one or more addresses in the digest corresponding to the one or more hash values to determine a corresponding one or more address values for each GUID of the set of GUIDs, wherein the one or more address values is indicative of the presence or absence of the corresponding GUID in the digest;
determining a presence of each GUID of the set of GUIDs in the digest based on the one or more address values;
iteratively repeating the applying, the referencing, and the determining for remaining GUIDs in the set of GUIDs until an absence of a GUID in the digest is determined; and
when a GUID is determined to be absent in the digest, identifying the divergence point as a position in the second list of knowledge object customizations corresponding to the GUID of the set of GUIDs that is absent from the digest.

13. The method of claim 1, wherein the first divergence point is determined by:
applying, to a set of global unique identifiers (GUIDs) comprising a sequence of consecutive GUIDs corresponding to a pre-determined number of knowledge object customizations of the second list of knowledge object customizations, one or more hash functions to each of the set of GUIDs to determine a corresponding one or more hash values for each GUID of the set of GUIDs;
referencing one or more addresses in the digest corresponding to the one or more hash values to determine a corresponding one or more address values, wherein the one or more address values is indicative of the presence or absence of the corresponding GUID in the digest;
determining a presence of each GUID of the set of GUIDs in the digest based on the one or more address values;
iteratively repeating the applying, the referencing, and the determining for remaining GUIDs in the set of GUIDs until an absence of a GUID in the digest is determined; and
when a GUID is determined to be absent in the digest, comparing the set of GUIDs to a corresponding sequence of GUIDs in the first list of knowledge object customizations to identify the divergence point,
wherein the iteratively repeating comprises, for each iteration, adding a GUID corresponding to a next knowledge object customization of the second list of knowledge object customizations to the set of GUIDs and performing the iteratively repeating for the sequence of consecutive GUIDs.

14. The method of claim 1, wherein the first divergence point is determined by:
applying, to a set of global unique identifiers (GUIDs) comprising a sequence of consecutive GUIDs corresponding to a pre-determined number of knowledge object customizations of the second list of knowledge object customizations, one or more hash functions to each of the set of GUIDs to determine a corresponding one or more hash values for each GUID of the set of GUIDs;
referencing one or more addresses in the digest corresponding to the one or more hash values to determine a corresponding one or more address values, wherein the one or more address values is indicative of the presence or absence of the corresponding GUID in the digest;

determining a presence of each GUID of the set of GUIDs in the digest based on the one or more address values;

removing the first GUID in the set of GUIDs and appending the set of GUIDs with a GUID corresponding to a next knowledge object customization of the second list of knowledge object customizations when all GUIDs in the set of GUIDs are determined to be present in the digest;

iteratively repeating the applying, the referencing, and the determining for remaining GUIDs in the one or more GUIDs until an absence of a GUID in the digest is determined; and when a GUID is determined to be absent in the digest, comparing the set of GUIDs to a corresponding sequence of GUIDs in the first list of knowledge object customizations to identify the divergence point.

15. The method of claim 1, wherein the first divergence point is determined by:

applying, to a set of global unique identifiers (GUIDs) comprising a sequence of consecutive GUIDs corresponding to a pre-determined number of knowledge object customizations of the second list of knowledge object customizations, one or more hash functions to each of the set of GUIDs to determine a corresponding one or more hash values for each GUID of the set of GUIDs;

referencing one or more addresses in the digest corresponding to the one or more hash values to determine a corresponding one or more address values, wherein the one or more address values is indicative of the presence or absence of the corresponding GUID in the digest;

determining a presence of all GUIDs of the set of GUIDs in the digest based on the one or more address values;

removing the first GUID in the set of GUIDs and appending the set of GUIDs with a GUID corresponding to a next knowledge object customization of the second list of knowledge object customizations when all GUIDs in the set of GUIDs are present in the digest;

iteratively repeating the applying, the referencing, and the determining for remaining GUIDs in the one or more GUIDs until an absence of a GUID in the digest is determined; and when a GUID is determined to be absent in the digest, comparing the set of GUIDs to a corresponding sequence of GUIDs in the first list of knowledge object customizations to identify the divergence point, wherein a size of the set of GUIDs is configurable.

16. The method of claim 1, wherein the digest comprises a one dimensional array of values, the one dimensional array having a configurable size.

17. The method of claim 1, wherein the data aggregation and analysis system employs a late-binding schema for searching data.

18. A system comprising:

a local data store comprising a first list of knowledge object customizations received from at least one client computing device; and a processing device coupled with the local data store, the processing device being configured to:

access, by a first search head of a cluster comprising a plurality of search heads, the first list of knowledge object customizations from the local data store;

propagate a digest of the first list of knowledge object customizations corresponding to the first search head to a second search head of the cluster, the digest being stored in the local data store;

receive an indication of a first divergence point determined between the first list of knowledge object customizations and a second list of knowledge object customizations corresponding to the second search head based on a comparison of the digest and the second list of knowledge object customizations, the first divergence point corresponding to a first position in the first list of knowledge object customizations; and based on the divergence point, send a first set of knowledge object customizations from the first list of knowledge object customizations to the second search head.

19. The system of claim 18, wherein the first set of knowledge object customizations comprises at least one knowledge object customization from the first list of knowledge object customizations relative to a position in the first list of knowledge object customizations corresponding to the first divergence point.

20. A non-transitory computer readable medium having instructions stored thereon which, when executed by a processing device, causes the processing device to perform configuration propagation, the instructions comprising:

instructions to access, by one or more processing devices corresponding to a first search head of a cluster comprising a plurality of search heads of a data aggregation and analysis system, a first list of knowledge object customizations corresponding to the first search head;

instructions to propagate a digest of the first list of knowledge object customizations corresponding to the first search head to a second search head of the cluster;

instructions to receive an indication of a first divergence point determined between the first list of knowledge object customizations and a second list of knowledge object customizations corresponding to the second search head based on a comparison of the digest and the second list of knowledge object customizations, the first divergence point corresponding to a first position in the first list of knowledge object customizations; and instructions to send a first set of knowledge object customizations from the first list of knowledge object customizations to the second search head based on the divergence point.

* * * * *